(12) United States Patent
Matsushima et al.

(10) Patent No.: US 11,818,320 B2
(45) Date of Patent: Nov. 14, 2023

(54) CONVERT A DOT AREA RATIO OF A TARGET PROCESS COLOR USING A FLUORESCENT COLOR FOR HIGHER BRIGHTNESS AND SATURATION

(71) Applicants: Yuki Matsushima, Kanagawa (JP); Takuroh Sawada, Tokyo (JP)

(72) Inventors: Yuki Matsushima, Kanagawa (JP); Takuroh Sawada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/230,916

(22) Filed: Apr. 14, 2021

(65) Prior Publication Data

US 2021/0329144 A1    Oct. 21, 2021

(30) Foreign Application Priority Data

Apr. 17, 2020 (JP) ................. 2020-074310
Feb. 12, 2021 (JP) ................. 2021-021180

(51) Int. Cl.
*H04N 1/60* (2006.01)
*G01J 3/52* (2006.01)

(52) U.S. Cl.
CPC .............. *H04N 1/6025* (2013.01); *G01J 3/52* (2013.01); *H04N 1/6008* (2013.01)

(58) Field of Classification Search
CPC ...... H04N 1/6025; H04N 1/6008; H04N 1/60; H04N 1/54; H04N 1/6058; H04N 1/6075; G01J 3/52
See application file for complete search history.

(56) References Cited

U.S. PATENT DOCUMENTS

| | | |
|---|---|---|
| 2002/0024609 A1 | 2/2002 | Matsushima |
| 2003/0020974 A1 | 1/2003 | Matsushima |
| 2003/0099407 A1 | 5/2003 | Matsushima |
| 2004/0126009 A1 | 7/2004 | Takenaka et al. |
| 2004/0201717 A1 | 10/2004 | Matsushima |
| 2005/0141763 A1 | 6/2005 | Matsushima |
| 2007/0041637 A1 | 2/2007 | Matsushima |
| 2007/0064250 A1 | 3/2007 | Matsushima |
| 2008/0002216 A1 | 1/2008 | Matsushima |
| 2009/0147313 A1 | 6/2009 | Miyagi et al. |
| 2009/0168108 A1 | 7/2009 | Matsushima |

(Continued)

FOREIGN PATENT DOCUMENTS

JP    2004291510 A  *  10/2004
JP    2004291510 A     10/2004

(Continued)

OTHER PUBLICATIONS

European Search Report; Application EP21168802; dated Sep. 17, 2021.

*Primary Examiner* — Christopher Wait
(74) *Attorney, Agent, or Firm* — Duft & Bornsen, PC

(57) ABSTRACT

An image processing apparatus includes control circuitry. The control circuitry is configured to: acquire first image data to be subjected to color conversion; and convert the first image data acquired, into second image data in which a dot area ratio of a target process color of process colors indicated by the first image data is distributed into a distributed dot area ratio of a fluorescent color different from the target process color and a distributed dot area ratio of the target process color.

19 Claims, 21 Drawing Sheets

(56) References Cited

U.S. PATENT DOCUMENTS

| | | | |
|---|---|---|---|
| 2009/0285612 A1 | 11/2009 | Matsushima | |
| 2012/0120424 A1 | 5/2012 | Hirano | |
| 2014/0320927 A1* | 10/2014 | Kuo | ........................ H04N 1/54 |
| | | | 358/2.1 |
| 2019/0260912 A1 | 8/2019 | Matsushima | |
| 2021/0029270 A1 | 1/2021 | Matsushima | |

FOREIGN PATENT DOCUMENTS

| | | |
|---|---|---|
| JP | 2006-251695 | 9/2006 |
| JP | 2015-058647 | 3/2015 |
| JP | 2019-056905 | 4/2019 |

* cited by examiner

FIG. 5

FOUR-COLOR PROFILE (BtoA)

| L | a | b | C | M | Y | K |
|---|---|---|---|---|---|---|
| 100 | 0 | 0 | 0 | 0 | 0 | 0 |
| ⋮ | ⋮ | ⋮ | ⋮ | ⋮ | ⋮ | ⋮ |
| Lt | at | bt | c | m | y | k |
| ⋮ | ⋮ | ⋮ | ⋮ | ⋮ | ⋮ | ⋮ |
| 0 | 0 | 0 | 100 | 100 | 100 | 100 |

FIG. 6

FIVE-COLOR PROFILE (BtoA)

| L | a | b | C | M | Y | K | NM |
|---|---|---|---|---|---|---|----|
| 100 | 0 | 0 | 0 | 0 | 0 | 0 | 0 |
| ⋮ | ⋮ | ⋮ | ⋮ | ⋮ | ⋮ | ⋮ | ⋮ |
| Lt | at | bt | c | $\alpha \cdot m$ | y | k | $(1-\alpha) \cdot m$ |
| ⋮ | ⋮ | ⋮ | ⋮ | ⋮ | ⋮ | ⋮ | ⋮ |
| 0 | 0 | 0 | 100 | $\alpha \cdot 100$ | 100 | 100 | $(1-\alpha) \cdot 100$ |

FIG. 7

FOUR-COLOR PROFILE (AtoB)

| C | M | Y | K | L | a | b |
|---|---|---|---|---|---|---|
| 0 | 0 | 0 | 0 | 100 | 0 | 0 |
| ⋮ | ⋮ | ⋮ | ⋮ | ⋮ | ⋮ | ⋮ |
| c | m | y | k | Lt | at | bt |
| ⋮ | ⋮ | ⋮ | ⋮ | ⋮ | ⋮ | ⋮ |
| 100 | 100 | 100 | 100 | 0 | 0 | 0 |

FIG. 8

FIVE-COLOR PROFILE (AtoB)

| C | M | Y | K | NM | L | a | b |
|---|---|---|---|---|---|---|---|
| 0 | 0 | 0 | 0 | 0 | 100 | 0 | 0 |
| ⋮ | ⋮ | ⋮ | ⋮ | ⋮ | ⋮ | ⋮ | ⋮ |
| c | $\alpha \cdot m$ | y | k | $(1-\alpha) \cdot m$ | Lt | at | bt |
| ⋮ | ⋮ | ⋮ | ⋮ | ⋮ | ⋮ | ⋮ | ⋮ |
| 100 | $\alpha \cdot 100$ | 100 | 100 | $(1-\alpha) \cdot 100$ | 0 | 0 | 0 |

FIG. 14

SPOT COLOR DICTIONARY

| Colorname | C | M | Y | K |
|---|---|---|---|---|
| Pantone180C | 3.5 | 92.1 | 81.4 | 12.8 |
| Pantone341C | 92.9 | 5.5 | 76.2 | 19.4 |
| Pantone611C | 2.7 | 7.4 | 84 | 10.8 |
| Pantone7489C | 54.9 | 2 | 78.6 | 7.9 |
| Pantone7570C | 1.6 | 54.8 | 89.6 | 6.2 |
| Pantone7647C | 8.5 | 83.2 | 6.7 | 24.5 |
| Pantone7673C | 69 | 57.9 | 6.4 | 25.4 |
| Pantone7690C | 85.7 | 25.6 | 4.2 | 16.4 |
| Pantone7712C | 93.6 | 3.1 | 30.5 | 11.1 |

FIG. 19

PRE-CHANGE FIVE-COLOR PROFILE (BtoA)

| L | a | b | C | M | Y | K | NM |
|---|---|---|---|---|---|---|---|
| 100 | 0 | 0 | 0 | 0 | 0 | 0 | 0 |
| ⋮ | ⋮ | ⋮ | ⋮ | ⋮ | ⋮ | ⋮ | ⋮ |
| Lt | at | bt | c | m | y | k | n |
| ⋮ | ⋮ | ⋮ | ⋮ | ⋮ | ⋮ | ⋮ | ⋮ |
| 0 | 0 | 0 | 100 | $m_{max}$ | 100 | 100 | $n_{max}$ |

FIG. 20

POST-CHANGE FIVE-COLOR PROFILE (BtoA)

| L | a | b | C | M | Y | K | NM |
|---|---|---|---|---|---|---|---|
| 100 | 0 | 0 | 0 | 0 | 0 | 0 | 0 |
| ⋮ | ⋮ | ⋮ | ⋮ | ⋮ | ⋮ | ⋮ | ⋮ |
| Lt | at | bt | c | $m - m \cdot \gamma$ | y | k | $n + m \cdot \gamma$ |
| ⋮ | ⋮ | ⋮ | ⋮ | ⋮ | ⋮ | ⋮ | ⋮ |
| 0 | 0 | 0 | 100 | $m_{max} - m_{max} \cdot \gamma$ | 100 | 100 | $n_{max} + m_{max} \cdot \gamma$ |

FIG. 21

PRE-CHANGE FIVE-COLOR PROFILE (AtoB)

| C | M | Y | K | NM | L | a | b |
|---|---|---|---|---|---|---|---|
| 0 | 0 | 0 | 0 | 0 | 100 | 0 | 0 |
| ⋮ | ⋮ | ⋮ | ⋮ | ⋮ | ⋮ | ⋮ | ⋮ |
| c | m | y | k | n | Lt | at | bt |
| ⋮ | ⋮ | ⋮ | ⋮ | ⋮ | ⋮ | ⋮ | ⋮ |
| 100 | $m_{max}$ | 100 | 100 | $n_{max}$ | 0 | 0 | 0 |

FIG. 22

POST-CHANGE FIVE-COLOR PROFILE (AtoB)

| C | M | Y | K | NM | L | a | b |
|---|---|---|---|---|---|---|---|
| 0 | 0 | 0 | 0 | 0 | 100 | 0 | 0 |
| ⋮ | ⋮ | ⋮ | ⋮ | ⋮ | ⋮ | ⋮ | ⋮ |
| c | $m - m \cdot \gamma$ | y | k | $n + m \cdot \gamma$ | Lt | at | bt |
| ⋮ | ⋮ | ⋮ | ⋮ | ⋮ | ⋮ | ⋮ | ⋮ |
| 100 | $m_{max} - m_{max} \cdot \gamma$ | 100 | 100 | $n_{max} + m_{max} \cdot \gamma$ | 0 | 0 | 0 |

CONVERT A DOT AREA RATIO OF A TARGET PROCESS COLOR USING A FLUORESCENT COLOR FOR HIGHER BRIGHTNESS AND SATURATION

CROSS-REFERENCE TO RELATED APPLICATIONS

This patent application is based on and claims priority pursuant to 35 U.S.C. § 119(a) to Japanese Patent Application Nos. 2020-074310, filed on Apr. 17, 2020, and 2021-021180, filed on Feb. 12, 2021, in the Japan Patent Office, the entire disclosure of which is hereby incorporated by reference herein.

BACKGROUND

Technical Field

Embodiments of the present disclosure relate to an image processing apparatus, an image processing method, and a storage medium.

Related Art

In general, an image recorded in a process color by subtractive color mixing in a copier, a printer, or the like has a narrower color reproduction range than an output image by additive color mixing in a display or the like. Since the color reproduction by the process color is based on the subtractive color mixing, there is a characteristic that as color materials are overlapped in order to obtain a vivid color, the brightness decreases and the color dulls. Therefore, in order to widen the color reproduction range and improve the hue, color materials are studied and usage of fluorescent materials are examined. Here, the process colors indicate four colors of C (cyan), M (magenta), Y (yellow), and K (black). When subtractive color mixing is performed using a fluorescent color material (fluorescent ink, fluorescent toner, or the like) to which a fluorescent material is added, it is expected that it is possible to reproduce a color tone with brightness and saturation higher than those in a state in which no fluorescent material is added (CMYK process color), and to expand a color reproduction range.

For example, a typical fluorescent ink is fluorescent magenta. Spectral distribution characteristics of fluorescent magenta, which hereinafter may be referred to as "NM" (neon magenta), and process color magenta, which hereinafter may be referred to as "M", are illustrated in FIG. 17, and their characteristics are described below. The first feature is that the two inks have absorption spectrum peaks in substantially the same band. The second feature is that the NM ink has a peak of the fluorescence spectrum on the long wavelength side of the peak of the absorption spectrum.

In the market, fluorescent ink has started to be used in offset printing machines and fluorescent toner has started to be used in electrophotographic machines. In the case of offset printing machines, there is an example in which an ink whose color is prepared in advance by adding fluorescent magenta to magenta is used instead of the magenta ink. In this case, image data can be created in the same process color as conventionally used. On the other hand, in electrophotographic machines, since toner is handled for each color, the fifth colorplate of image data for fluorescent magenta is necessary in addition to the four colorplates for the process colors. In the electronic submission, since the submission condition is that the data is data to be advanced to the printing process without being processed, corrected, adjusted, or the like in the printing company as the submission destination, the designer as the submission source needs to create the fifth colorplate. However, it is a heavy burden to create the fifth colorplate by oneself using a limited application. Therefore, there is a demand for functions capable of easily decomposing image data input in four colors into five colors at the time of printing and easily designating a printable color to which fluorescent toner is added.

As a technology using color materials other than process colors, there is known a technology in which when CMYK of process colors is decomposed into CMYK, light cyan (LC), and light magenta (LM), in order to reduce density unevenness, LC ink is added so as to be maximum in an intermediate gradation range (around 75% to 95%) in which C (cyan) ink increases, and is reduced in a high saturation range (95% or more).

SUMMARY

According to an aspect of the present disclosure, an image processing apparatus includes control circuitry. The control circuitry is configured to: acquire first image data to be subjected to color conversion; and convert the first image data acquired, into second image data in which a dot area ratio of a target process color of process colors indicated by the first image data is distributed into a distributed dot area ratio of a fluorescent color different from the target process color and a distributed dot area ratio of the target process color.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating an example of a BtoA table of a four-color profile;

FIG. 6 is a diagram illustrating an example of a BtoA table of a five-color profile;

FIG. 7 is a diagram illustrating an example of an AtoB table of a four-color profile;

FIG. 8 is a diagram illustrating an example of an AtoB table of a five-color profile;

FIG. 14 is a diagram illustrating an example of a spot color dictionary;

FIG. 19 is a diagram illustrating an example of a BtoA table of a pre-change five-color profile;

FIG. 20 is a diagram illustrating an example of a BtoA table of a post-change five-color profile;

FIG. 21 is a diagram illustrating an example of an AtoB table of a pre-change five-color profile;

FIG. 22 is a diagram illustrating an example of an AtoB table of a post-change five-color profile;

Figure 1:
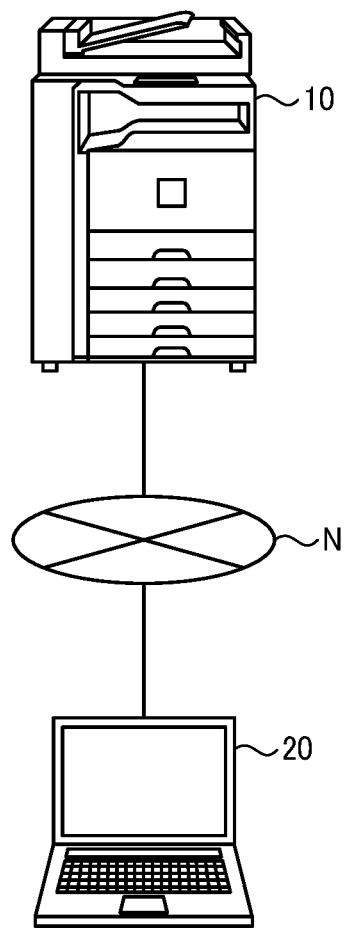
FIG. 1 is an illustration of a configuration of a system including an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an image processing apparatus, an image processing method, and a program according to embodiments of the present disclosure are described in detail with reference to drawings. In addition, embodiments of the present disclosure are not limited to the following embodiments, and components in the following embodiments include components that can be easily conceived by a person skilled in the art, components that are substantially the same, and components within a so-called equivalent range. Furthermore, various omissions, substitutions, changes, and combinations of components may be made without departing from the scope of the following embodiments.

First Embodiment

As in the case of an offset printing machine, using a small amount of fluorescent color mixed with a process color allows a vivid impression to be obtained without color dulling even in high saturation color. In such a case, since the visual impression is more prioritized than the numerical accuracy of the color, for example, the device value of magenta may be distributed to magenta and fluorescent magenta. Actual color conversion is performed based on the International Color Consortium (ICC) profile defined by the ICC. A large number of various color matching technologies such as a method of creating profiles and a method of adjusting colors are disclosed to manage colors of printed matter. Such color matching technologies can be applied not only to electrophotographic printing machines but also to general digital printers including inkjet printers and thermal printers and peripheral devices thereof. In the present embodiment, an example of color conversion using a profile is described in detail.

As an overview of the present embodiment, in order to create a five-color profile, the device value of magenta is distributed and the device values of magenta and fluorescent magenta are calculated. Here, the five-color profile includes a source profile and a printer profile. The source profile defines a correspondence relationship between Lab values corresponding to grid points of C, M, Y, K, and NM to be input. The printer profile defines a correspondence relationship between values of C, M, Y, K, and NM corresponding to grid points of L, a, and b to be input. Here, the Lab value is a color value in the Lab color space. A controller of the image forming apparatus according to the present embodiment performs color conversion of a CMYK image into a CMYK+NM image using a four-color profile and a five-color profile.

The distribution also includes, for example, calculating the device values of magenta and fluorescent magenta based on the device value of magenta. For example, the distribution includes calculating and converting the device value of magenta and the device value of fluorescent magenta so that, when the device value of magenta before conversion is set to 1, (device value of fluorescent magenta after conversion):(device value of magenta after conversion)=$1-\alpha:\alpha$ ($0<\alpha<1$) (an example of a predetermined ratio) is satisfied. The distribution also includes calculating and converting the device value of fluorescent magenta and the device value of magenta so that, when the device value of magenta before conversion is set to 1, (device value of fluorescence magenta after conversion):(device value of magenta after conversion)=1−α:α+<α<1, β: any given value) (another example of the predetermined ratio) is satisfied.

Hereinafter, the present embodiment is described using an example in which (device value of fluorescent magenta after conversion):(device value of magenta after conversion)=1−α:α (0<α<1).

System including image forming apparatus FIG. 1 is an illustration of a configuration of a system including an image forming apparatus according to a first embodiment of the present disclosure. A configuration of a system including an image forming apparatus 10 according to the present embodiment is described with reference to FIG. 1.

The system illustrated in FIG. 1 includes an image forming apparatus 10 and a personal computer (PC) 20. The image forming apparatus 10 and the PC 20 can communicate with each other via a network N.

The image forming apparatus 10 is an apparatus that performs image formation (printing) based on image data received from the outside or image data stored in a storage device disposed in the apparatus. The image forming apparatus 10 is, for example, a multifunction peripheral (MFP) and is an example of an image processing apparatus.

The PC 20 is an information processing device that transmits, to the image forming apparatus 10, created or selected image data together with a print command on the image data according to a user operation. The PC 20 is not limited to a PC, and may be an information processing device such as a smartphone, a tablet terminal, or a scanner device.

Note that the configuration of the system illustrated in FIG. 1 is an example, and for example, a print server that manages print jobs including image date output from the PC 20 may be included in the system.

Hardware Configuration of Image Forming Apparatus

Figure 2:
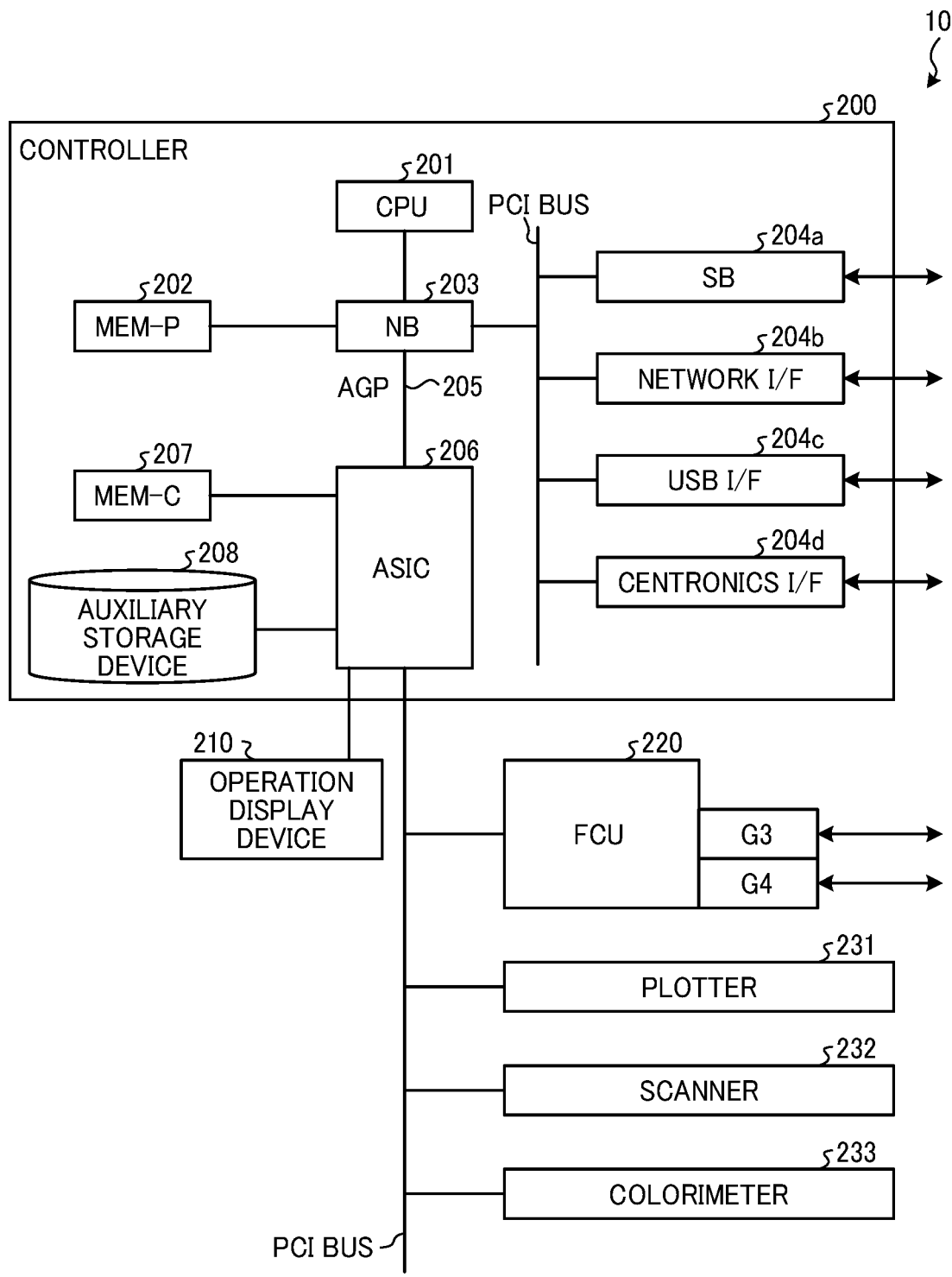
FIG. 2 is a diagram illustrating an example of a hardware configuration of the image forming apparatus according to the first embodiment.

FIG. 2 is a diagram illustrating an example of a hardware configuration of the image forming apparatus according to the first embodiment. The hardware configuration of the image forming apparatus 10 according to the present embodiment is described with reference to FIG. 2.

As illustrated in FIG. 2, the image forming apparatus 10 according to the present embodiment includes a controller 200, an operation display device 210, a facsimile control unit (FCU) 220, a plotter 231 (printing apparatus), a scanner 232, and a colorimeter 233, which are connected via a peripheral component interface (PCI) bus.

The controller 200 is a device that controls the entire image forming apparatus 10, drawing, communication, and input from the operation display device 210.

The operation display device 210 is, for example, a touch panel or the like, and is a device that receives an input to the controller 200 (input function) and displays a state or the like of the image forming apparatus 10 (display function), and is directly connected to an application specific integrated circuit (ASIC) 206 described later.

The FCU 220 is a device that implements a facsimile function, and is connected to the ASIC 206 by the PCI bus, for example.

The plotter 231 is a device that implements a printing function, and is connected to the ASIC 206 via the PCI bus, for example. The scanner 232 is a function that implements a scanner function, and is connected to the ASIC 206 via the PCI bus, for example. The colorimeter 233 is a device that performs colorimetry on an image printed on a recording medium and acquires a color value of a device-independent color space (for example, a Lab color space) as a colorimetric value, and is connected to ASIC 206 via, for example, the PCI bus.

The controller 200 includes a central processing unit (CPU) 201, a system memory (MEM-P) 202, a north bridge (NB) 203, a south bridge (SB) 204a, a network I/F 204b, a universal serial bus (USB) I/F 204c, a Centronics I/F 204d, the ASIC 206, a local memory (MEM-C) 207, and an auxiliary storage device 208.

The CPU 201 controls the entire image forming apparatus 10, and is connected to a chip set including the system memory 202, the NB 203, and the SB 204a, and is connected to other devices via the chip set.

The system memory 202 is a memory used as a memory for storing programs and data, a memory for developing programs and data, a memory for drawing of a printer, and the like, and includes a read only memory (ROM) and a random access memory (RAM). The ROM is a read-only memory for storing programs and data. The RAM is a writable and readable memory for, for example, loading programs and data, and storing drawing data of the printer.

The NB 203 is a bridge for connecting the CPU 201, the system memory 202, the SB 204a, and an accelerated graphics port (AGP) bus 205, and includes a memory controller that controls reading and writing from and to the system memory 202, a PCI master, and an AGP target.

The SB 204a is a bridge for connecting the Nb 203 to PCI devices and peripheral devices. The SB 204a is connected to the NB 203 via the PCI bus, and a network I/F 204b, the USB I/F 204c, the Centronics I/F 204d, and the like are connected to the PCI bus.

The AGP bus 205 is a bus interface for a graphics accelerator card that has been proposed to speed up graphics processing. The AGP bus 205 is a bus that directly access the system memory 202 at high throughput to speed up a graphics accelerator card.

The ASIC 206 is an integrated circuit (IC) for image processing having hardware elements for image processing, and serves as a bridge that connects the AGP bus 205, the PCI bus, the auxiliary storage device 208, and the local memory 207 with each other. The ASIC 206 includes a PCI target and an AGP master, an arbiter (ARB) that is a core of the ASIC 206, a memory controller that controls the local memory 207, a plurality of direct memory access controllers (DMACs) that perform rotation of image data by hardware logic or the like, and a PCI unit that performs data transfer between the plotter 231 and the scanner 232 via the PCI bus. For example, the FCU 220, the plotter 231, the scanner 232, and the colorimeter 233 are connected to the ASIC 206 via the PCI bus. The ASIC 206 is also connected to a host personal computer (PC), a network, and the like.

The local memory 207 is a memory used as a copy image buffer and a code buffer.

The auxiliary storage device 208 is a storage device such as a hard disk drive (HDD), a solid state drive (SSD), a secure digital (SD) card, or a flash memory, and is a storage for storing image data, programs, font data, forms, and the like.

The program of the image forming apparatus 10 may be recorded in and distributed as a computer-readable storage medium (the auxiliary storage device 208 or the like) as a file in an installable format or an executable format.

The colorimeter 233 performs data transmission with the controller 200 via the PCI bus, but is not limited thereto, and may perform data transmission with the controller 200 through a network via the network I/F 204b.

The hardware configuration of the image forming apparatus 10 illustrated in FIG. 2 is an example, and the image forming apparatus 10 does not need to include all the constituent devices illustrated in FIG. 2, and may include other constituent devices.

Figure 3:
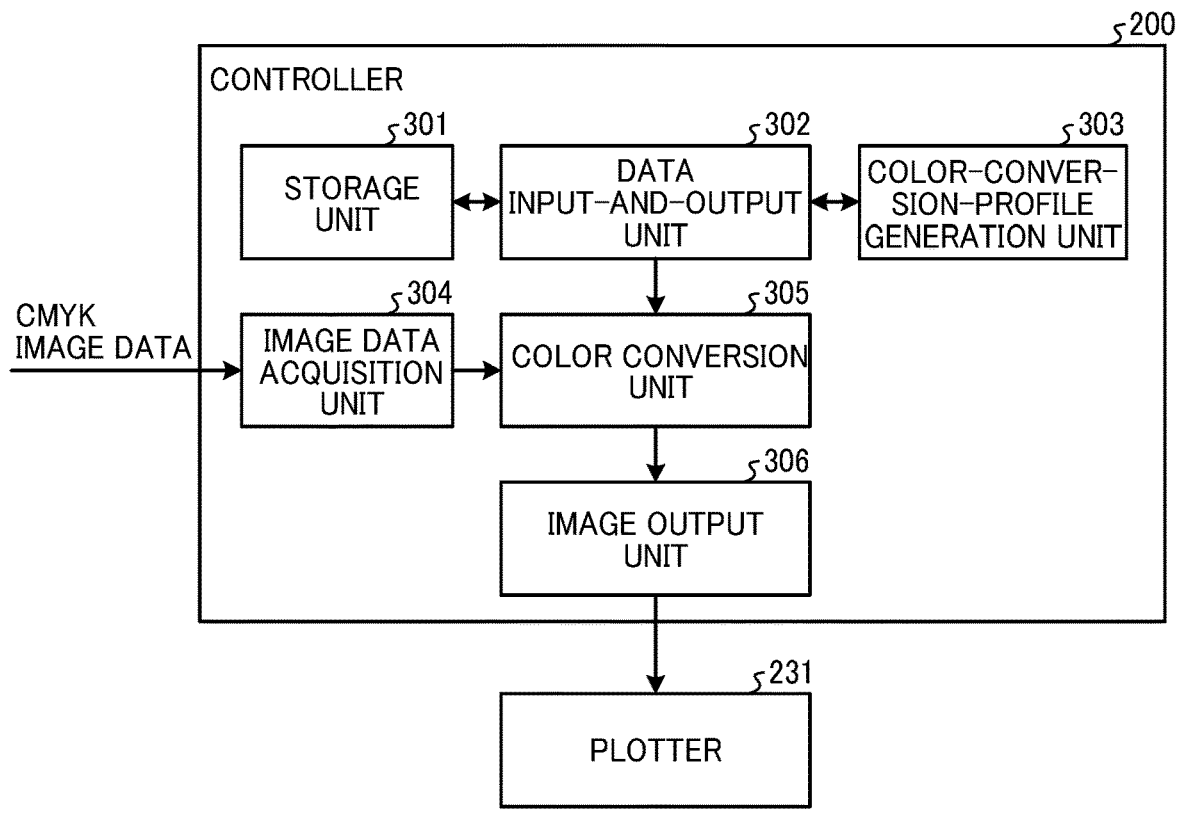
FIG. 3 is a diagram illustrating an example of a configuration of a functional block of a controller of the image forming apparatus according to the first embodiment.
Figure 4:
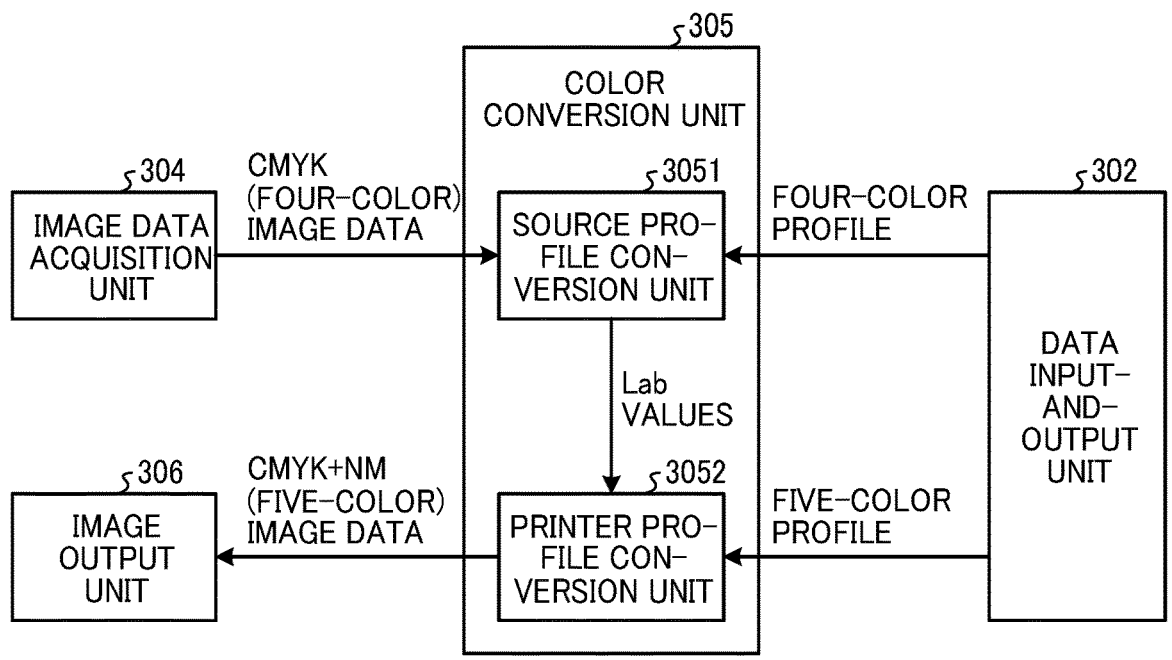
FIG. 4 is a diagram illustrating an example of a configuration of functional blocks of a color conversion unit of the controller of the image forming apparatus according to the first embodiment.

Configuration and Operation of Functional Blocks of Controller of Image Forming Apparatus FIG. 3 is a diagram illustrating an example of a configuration of functional blocks of a controller of the image forming apparatus according to the first embodiment. FIG. 4 is a diagram illustrating an example of a configuration of functional blocks of a color conversion unit of the controller of the image forming apparatus according to the first embodiment. FIG. 5 is a diagram illustrating an example of a BtoA table of a four-color profile. FIG. 6 is a diagram illustrating an example of a BtoA table of a five-color profile. FIG. 7 is a diagram illustrating an example of an AtoB table of a four-color profile. FIG. 8 is a diagram illustrating an example of an AtoB table of a five-color profile. The configuration and operation of functional blocks of the controller 200 of the image forming apparatus 10 according to the present embodiment are described with reference to FIGS. 3 to 8.

As illustrated in FIG. 3, the controller 200 of the image forming apparatus 10 includes a storage unit 301, a data input-and-output unit 302, a color-conversion-profile generation unit 303 (first generation unit), an image data acquisition unit 304 (first acquisition unit), a color conversion unit 305, and an image output unit 306.

The storage unit 301 is a functional unit that stores a four-color ICC profile (four-color profile), a five-color ICC profile (five-color profile) generated by the color-conversion-profile generation unit 303, and the like. The storage unit 301 is implemented by the auxiliary storage device 208 illustrated in FIG. 2.

The data input-and-output unit 302 is a functional unit that reads data from the storage unit 301 and writes data to the storage unit 301. The data input-and-output unit 302 is implemented by, for example, a program executed by the CPU 201 illustrated in FIG. 2.

The color-conversion-profile generation unit 303 is a functional unit that receives a four-color profile from the storage unit 301 via the data input-and-output unit 302, distributes a device value of magenta (M) (an example of a process color of the same color system as a color system of a spot color), calculates device values of magenta (M) and fluorescent magenta (NM) (an example of a spot color and an example of a fluorescent color), and generates a five-color profile. Here, the device value indicates a halftone dot area ratio that is a ratio of a halftone dot area to a unit area.

The process color of the same color system is a process color having a peak of an absorption spectrum closest to a peak of an absorption spectrum of a fluorescent color among process colors.

FIG. 5 represents a BtoA table of a four-color profile. Here, "BtoA" means conversion from Lab values to CMYK values (or CMYK+NM values), and "AtoB" described later means conversion from CMYK values (or CMYK+NM values) to Lab values. In the present embodiment, in order to generate a five-color profile, the color-conversion-profile generation unit 303 distributes the device value of magenta (M) of the four-color profile acquired from the storage unit 301 via the data input-and-output unit 302, and assigns a distribution factor, which is a fixed value, when calculating the device values of magenta (M) and fluorescent magenta (NM). That is, when the CMYK values corresponding to the Lab values (Lab grid points) described in the BtoA table of the four-color profile as the printer profile are C=c (0≤c≤100), Y=y (0≤y≤100), and K=k (0≤k≤100), the color-conversion-profile generation unit 303 performs distribution only for magenta (M) and calculates the device value of fluorescent magenta (NM) as C=c, M=α×m (0≤m≤100), Y=y, K=k, and NM=(1−α)×m using the fixed distribution factor α. Here, the distribution factor α is 0≤α≤1, and ideally α≈0.4 is appropriate. Then, the color-conversion-profile generation unit 303 performs the above-described distribution of magenta (M) for all Lab values (Lab grid points) in the BtoA table of the four-color profile, and calculates device values of magenta (M) and fluorescent magenta (NM). The color-conversion-profile generation unit 303 sets the CMYK+NM values corresponding to the respective Lab values (Lab grid points) to generate the BtoA table of the five-color profile illustrated in FIG. 6.

Similarly, the color-conversion-profile generation unit 303 adds an NM value to each set of CMYK values (CMYK grid points) described in the AtoB table of the four-color profile as the source profile illustrated in FIG. 7 to expand the AtoB table to five colors, and calculates the device values of magenta (M) and fluorescent magenta (NM) as in the BtoA table described above. The color-conversion-profile generation unit 303 sets each CMYK+NM value in the new AtoB table to generate the AtoB table of the five-color profile illustrated in FIG. 8.

Here, the color-conversion-profile generation unit 303 rewrites only the device values in both the BtoA table and the AtoB table and does not rewrite the Lab values constituting the profile connection space (PCS). The color-conversion-profile generation unit 303 rewrites necessary tags in expanding the four-color profile to the five-color profile.

The color-conversion-profile generation unit 303 stores the generated five-color profile in the storage unit 301 via the data input-and-output unit 302. The color-conversion-profile generation unit 303 is implemented by, for example, a program executed in the CPU 201 illustrated in FIG. 2.

The image data acquisition unit 304 is a functional unit that acquires CMYK image data (an example of first image data) from the PC 20 or the like via the network N, for example. The image data acquisition unit 304 sends the acquired CMYK image data to the color conversion unit 305. The image data acquisition unit 304 is implemented by, for example, a program executed in the CPU 201 illustrated in FIG. 2.

The color conversion unit 305 is a functional unit that acquires CMYK image data from the image data acquisition unit 304, acquires a four-color profile and a five-color profile from the storage unit 301 via the data input-and-output unit 302, and performs color conversion of the four-color CMYK image data into five-color CMYK+NM image data (an example of second image data) depending on the printer (plotter 231) using the acquired four-color profile and five-color profile. As the CMYK+NM image data, for example, color data created by changing device values of C, M, Y, K, and NM in a range of 0 to 100 may be used.

As illustrated in FIG. 4, the color conversion unit 305 includes a source profile conversion unit 3051 and a printer profile conversion unit 3052.

The source profile conversion unit 3051 is a functional unit that acquires a four-color profile from the storage unit 301 via the data input-and-output unit 302, and converts the CMYK values of each one of the pixels constituting the four-color CMYK image data acquired from the image data acquisition unit 304 into Lab values using the four-color profile. The source profile conversion unit 3051 sends the converted Lab values to the printer profile conversion unit 3052.

The printer profile conversion unit 3052 is a functional unit that acquires a five-color profile from the storage unit 301 via the data input-and-output unit 302, and converts the Lab values received from the source profile conversion unit 3051 into five-color image data including CMYK+NM values using the five-color profile. The printer profile conversion unit 3052 sends the converted five-color CMYK+NM image data of image data to the image output unit 306.

The color conversion unit 305 is implemented by, for example, a program executed in the CPU 201 illustrated in FIG. 2.

The image output unit 306 is a functional unit that outputs the CMYK+NM image data color-converted by the color conversion unit 305 to the printer (plotter 231) and causes the printer to execute printing. The image output unit 306 is implemented by, for example, a program executed in the CPU 201 illustrated in FIG. 2.

Among the functional units of the controller 200 illustrated in FIG. 3, at least a part of a functional unit implemented by software (program) may be implemented by a hardware circuit such as a field-programmable gate array (FPGA) or an application specific integrated circuit (ASIC).

Each functional unit of the controller 200 illustrated in FIG. 3 conceptually illustrates a function, and is not limited to such a configuration. For example, a plurality of functional units illustrated as independent functional units in the controller 200 illustrated in FIG. 3 may be configured as one functional unit. Alternatively, the function of one functional unit in the controller 200 illustrated in FIG. 3 may be divided into a plurality of functional units.

Five-Color Profile Generation Process

Figure 9:
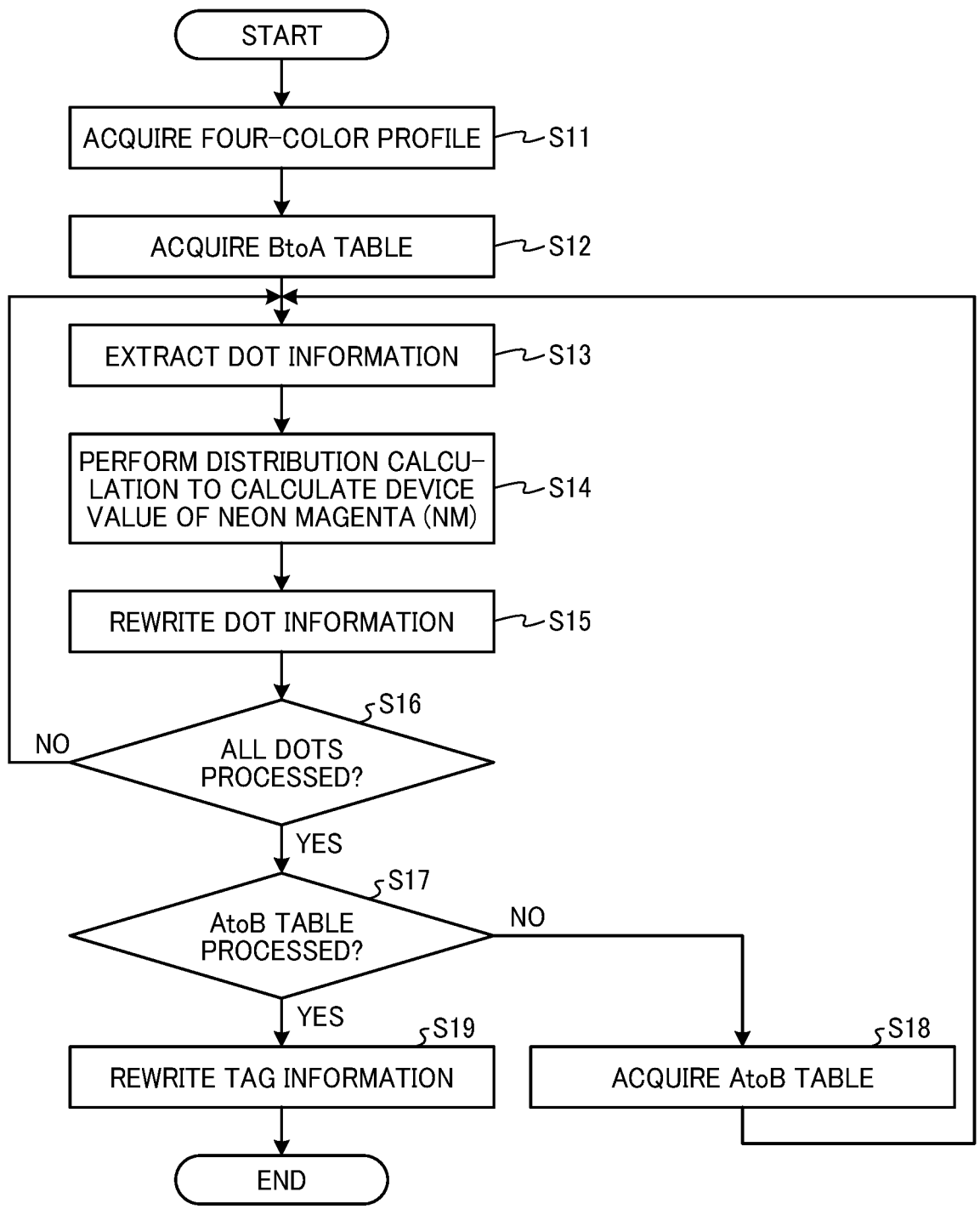
FIG. 9 is a flowchart illustrating an example of a flow of a five-color profile generation process of the image forming apparatus according to the first embodiment.

FIG. 9 is a flowchart illustrating an example of a flow of a five-color profile generation process of the image forming apparatus according to the first embodiment. With reference to FIG. 9, a flow of a five-color profile generation process of the image forming apparatus 10 according to the present embodiment is described.

Step S11

First, the color-conversion-profile generation unit 303 acquires a four-color profile (first profile) from the storage unit 301 via the data input-and-output unit 302. Then, the process proceeds to step S12.

Step S12

The color-conversion-profile generation unit 303 acquires a BtoA table (for example, see FIG. 5) from the acquired four-color profile. The process proceeds to step S13.

Step S13

The color-conversion-profile generation unit 303 extracts CMYK values as dot information from the BtoA table of the acquired four-color profile. The process proceeds to step S14.

Step S14

The color-conversion-profile generation unit 303 distributes the device value of magenta (M) among the extracted CMYK values calculates device values of magenta (M) and fluorescent magenta (NM). The process proceeds to step S15.

Step S15

The color-conversion-profile generation unit 303 rewrites, for example, the CMYK values of the BtoA table of the acquired four-color profile to CMYK+NM values including the calculated device values of magenta (M) and fluorescent magenta (NM). Then, the process proceeds to step S16.

Step S16

When the processing of steps S13 to S15 is completed for all CMYK values (dot information) in the BtoA table of the four-color profile acquired by the color-conversion-profile generation unit 303 (YES in step S16), the process proceeds to step S17. When the processing of steps S13 to S15 is not completed (NO in step S16), the process returns to step S13. When the processing of steps S13 to S15 is completed for all the CMYK values (dot information) in the BtoA table of the four-color profile acquired by the color-conversion-profile generation unit 303, the BtoA table of the five-color profile is generated.

Step S17

If the processing of steps S13 to S16 has already been performed for the AtoB table of the four-color profile (YES in step S17), the process proceeds to step S19. If the processing has not yet been performed (NO in step S17), the process proceeds to step S18.

Step S18

The color-conversion-profile generation unit 303 acquires an AtoB table (see FIG. 7, for example) from the acquired four-color profile. Then, the process returns to S13.

Step S19

In the above-described process, when the BtoA table and the AtoB table of the five-color profile (second profile) are generated by the color-conversion-profile generation unit 303 with respect to the BtoA table and the AtoB table of the four-color profile, the color-conversion-profile generation unit 303 rewrites tags necessary for extension to the five-color profile. Then, the five-color profile generation process ends.

Printing Process of Image Forming Apparatus

Figure 10:
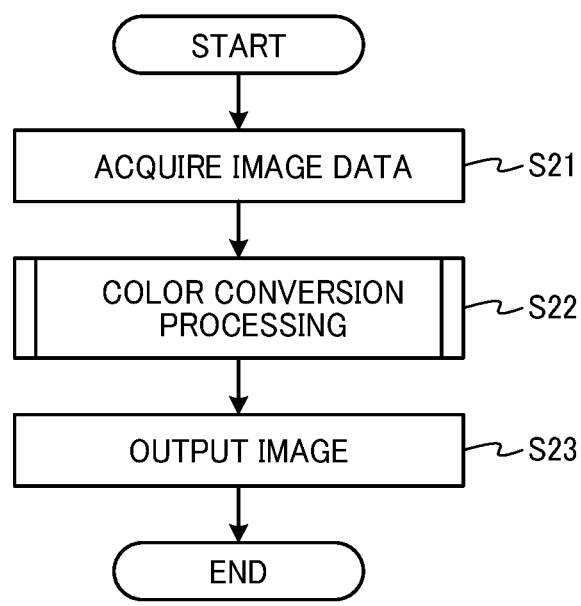
FIG. 10 is a flowchart illustrating an example of a flow of a printing process of the image forming apparatus according to the first embodiment.
Figure 11:
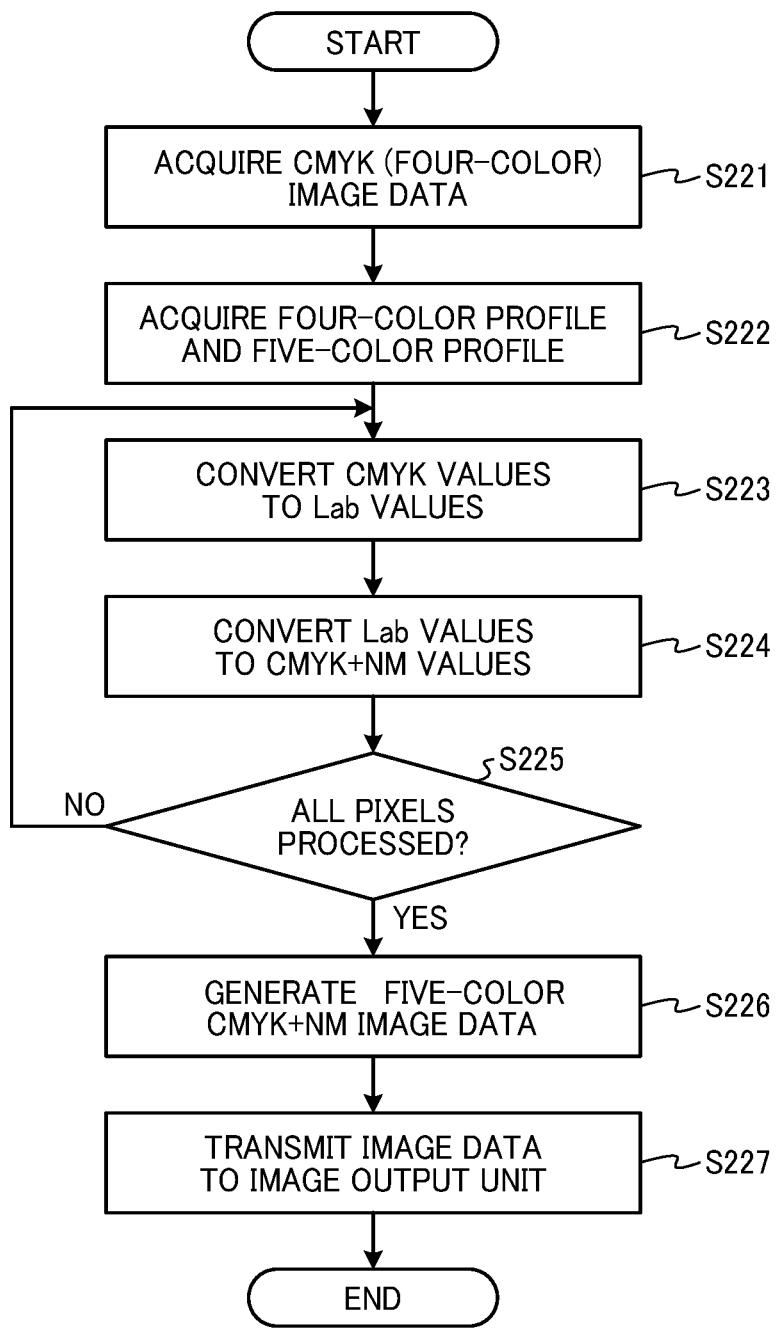
FIG. 11 is a flowchart illustrating an example of a color conversion process in the printing process of the image forming apparatus according to the first embodiment.

FIG. 10 is a flowchart illustrating an example of a flow of a printing process of the image forming apparatus according to the first embodiment. FIG. 11 is a flowchart illustrating an example of a color conversion process in a printing process of the image forming apparatus according to the first embodiment. A flow of the printing process of the image forming apparatus 10 according to the present embodiment is described with reference to FIGS. 10 and 11. It is assumed that the five-color profile illustrated in FIG. 9 is generated in advance and stored in the storage unit 301.

Step S21

First, when the user performs an operation of executing printing of image data through the operation display device 210, the image data acquisition unit 304 acquires four-color CMYK image data through the network N. Then, the process proceeds to step S22.

Step S22

The image forming apparatus 10 executes the color conversion process illustrated in FIG. 11. The color conversion process is executed in the flow of the following steps S221 to S227.

Step S221

The source profile conversion unit 3051 of the color conversion unit 305 acquires the four-color CMYK image data acquired by the image data acquisition unit 304. Then, the process proceeds to step S222.

Step S222

The source profile conversion unit 3051 acquires a four-color profile from the storage unit 301 via the data input-and-output unit 302. The printer profile conversion unit 3052 of the color conversion unit 305 acquires the five-color profile from the storage unit 301 via the data input-and-output unit 302. Then, the process proceeds to step S223.

Step S223

The source profile conversion unit 3051 acquires four-color CMYK image data from the image data acquisition unit 304. Next, the source profile conversion unit 3051 uses the acquired four-color profile (AtoB table) to convert the CMYK values of pixels constituting the acquired four-color CMYK data to Lab values. The source profile conversion unit 3051 sends the converted Lab values to the printer profile conversion unit 3052. Then, the process proceeds to step S224.

Step S224

The printer profile conversion unit 3052 converts the Lab values received from the source profile conversion unit 3051 into CMYK+NM values using the acquired five-color profile (BtoA table), and replaces the target CMYK values to the CMYK+NM values in the four-color CMYK image data. Then, the process proceeds to step S225.

Step S225

When all the pixels of the four-color CMYK image data have been converted into and replaced to CMYK+NM values (YES in step S225), the process proceeds to step S226. When all the pixels have not been processed (NO in step S225), the process returns to step S223.

Step S226

The printer profile conversion unit 3052 replaces all of the CMYK values of the pixels constituting the four-color CMYK image data with CMYK+NM values to generate five-color CMYK+NM image data. The CMYK+NM values constituting the five-color CMYK+NM image data are device values depending on the printer (plotter 231). Then, the process proceeds to step S227.

Step S227

The printer profile conversion unit 3052 sends the generated five-color CMYK+NM image data to the image output unit 306. The color conversion process is ended, and the process proceeds to step S23 in FIG. 10.

Step S23

The image output unit 306 outputs the five-color CMYK+NM image data color-converted by the color conversion unit 305 to the printer (plotter 231), and causes the printer to execute printing. Specifically, when the image data received from the color conversion unit 305 are five-color image data, the image output unit 306 checks that the toner of the fifth station of the plotter 231 is fluorescent magenta. When a toner different from fluorescent magenta is loaded, for example, the operation display device 210 displays a notification prompting replacement of the toner bottle. When the fluorescent magenta toner is loaded, the image output unit 306 outputs the five-color CMYK+NM image data to the printer (plotter 231) to cause the printer to execute printing.

As described above, in the image forming apparatus 10 according to the present embodiment, the color-conversion-profile generation unit 303 generates the five-color profile from the four-color profile. The color conversion unit 305 converts the four-color CMYK image data into the Lab values by the four-color profile, and the Lab values are converted into the CMYK+NM values by the five-color profile. Accordingly, the color conversion into the five-color CMYK+NM image data is performed. Thus, an algorithm for color conversion is constructed, thus facilitating image data to be created when a fluorescent color material is used.

In the above-described embodiment, the device value of magenta (M) of the four-color profile is distributed, the device value of fluorescent magenta as the fluorescent color material is calculated, and the five-color profile is generated. However, the way of distribution and calculation of device value is not limited to the above-described example. For example, the device value of cyan (C) or yellow (Y) of the four-color profile may be distributed, and the device value of the fluorescent color material may be calculated to generate the five-color profile.

Second Embodiment

An image forming apparatus according to a second embodiment is described focusing on differences from the image forming apparatus 10 according to the first embodiment. In the first embodiment, the operation using the fixed distribution factor has been described in order to generate the five-color profile from the four-color profile. In the present embodiment, a description is given of an operation of changing the distribution factor according to the Lab values when generating a five-color profile. The hardware configuration and the functional block configuration of the image forming apparatus according to the present embodiment are similar to those described in the first embodiment.

Figure 12:
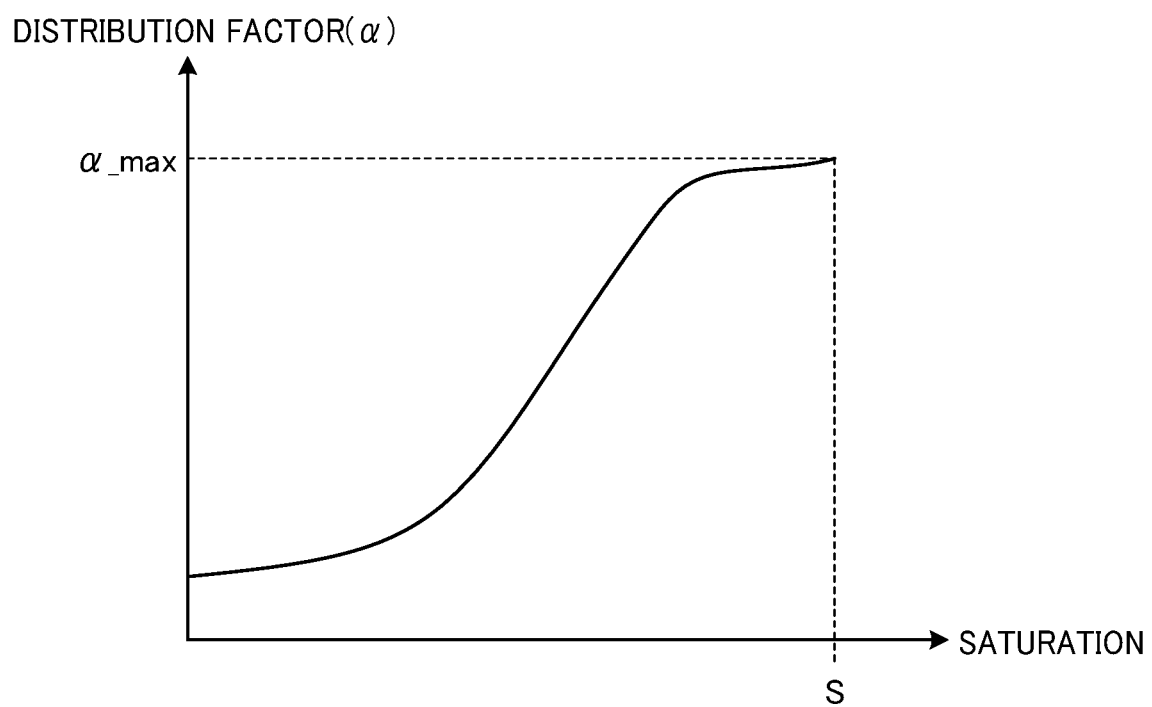
FIG. 12 is a graph illustrating a relationship between saturation and distribution factor.

FIG. 12 is a graph illustrating a relationship between the saturation and the distribution factor. The relationship between the saturation and the distribution factor is described with reference to FIG. 12.

As illustrated in FIG. 12, the distribution factor α is determined according to the saturation S. When the device value of magenta (M) is distributed to the device value of fluorescent magenta (NM), the distribution factor α determined from the saturation S of the grid point (Lab value) is used. That is, the color-conversion-profile generation unit 303 calculates the saturation S from the Lab values (Lab grid points) described in the BtoA table of the four-color profile as the printer profile, and determines the distribution factor α according to the saturation S. For example, as illustrated in FIG. 12, the color-conversion-profile generation unit 303 may determine in advance a function that defines the relationship between the saturation S and the distribution factor α, to determine the distribution factor α from the saturation S. The determination of the distribution factor α by the color-conversion-profile generation unit 303 may be performed in step S14 of FIG. 9 described above. The other processing of the five-color profile generation process and the printing process of the image forming apparatus 10 are the same as those described in the first embodiment.

The same or similar effects as those of the first embodiment can be obtained by the operation described above.

Third Embodiment

An image forming apparatus according to a third embodiment is described focusing on differences from the image forming apparatus 10 according to the first embodiment. In the first embodiment, the operation of distributing the device value of the process color directly to the device value of the fluorescent color has been described. In such a case, the color value defined in the Lab color space may not match the color value of the target color. In the present embodiment, an operation is described in which, based on at least a device value of a fluorescent color and a color value of a target color, device values of other process colors are calculated to obtain a color value close to the target color. The hardware configuration of the image forming apparatus according to the present embodiment is similar to that described in the first embodiment.

Designers specify a color with reference to the patch color (target color) of a color sample book. Examples of the target color include a color designated by a color sample book defined by DIC Color Guide (registered trademark), PANTONE (registered trademark), or the like, and a color designated by a color chip. For example, in the case of DIC Color Guide, the target color is designated by a color name such as "DIC001". In such color sample books, color samples including a plurality of patches and corresponding Lab values are provided, and the described Lab values are color values of target colors. Hereinafter, data including pairs of color names and color values in the color sample book are referred to as color sample data. Note that the result of color measurement by the colorimeter 233 may be used as the target color in order to match the color measurement conditions when creating the color reproduction characteristics in the color-reproduction-characteristic creation unit 313 described later.

Currently, there is no official regulation for numerically managing fluorescent colors. However, for example, in a case where it is assumed that a user views a printed material under a fluorescent lamp that does not include ultraviolet light, a color of the printed material can be represented by an approximate color using a Lab color space that is standardized by the International Commission on Illumination (CIE: Commission Internationale de l'Eclairage) and is also adopted by the Japanese Industrial Standards (JIS). Using such a Lab color space can create a profile in which a fluorescent color is mixed with a process color, or to create a spot color dictionary. In the present embodiment, a description is given of an operation of creating a spot color dictionary for reproducing a target color in a color sample book.

Figure 13:
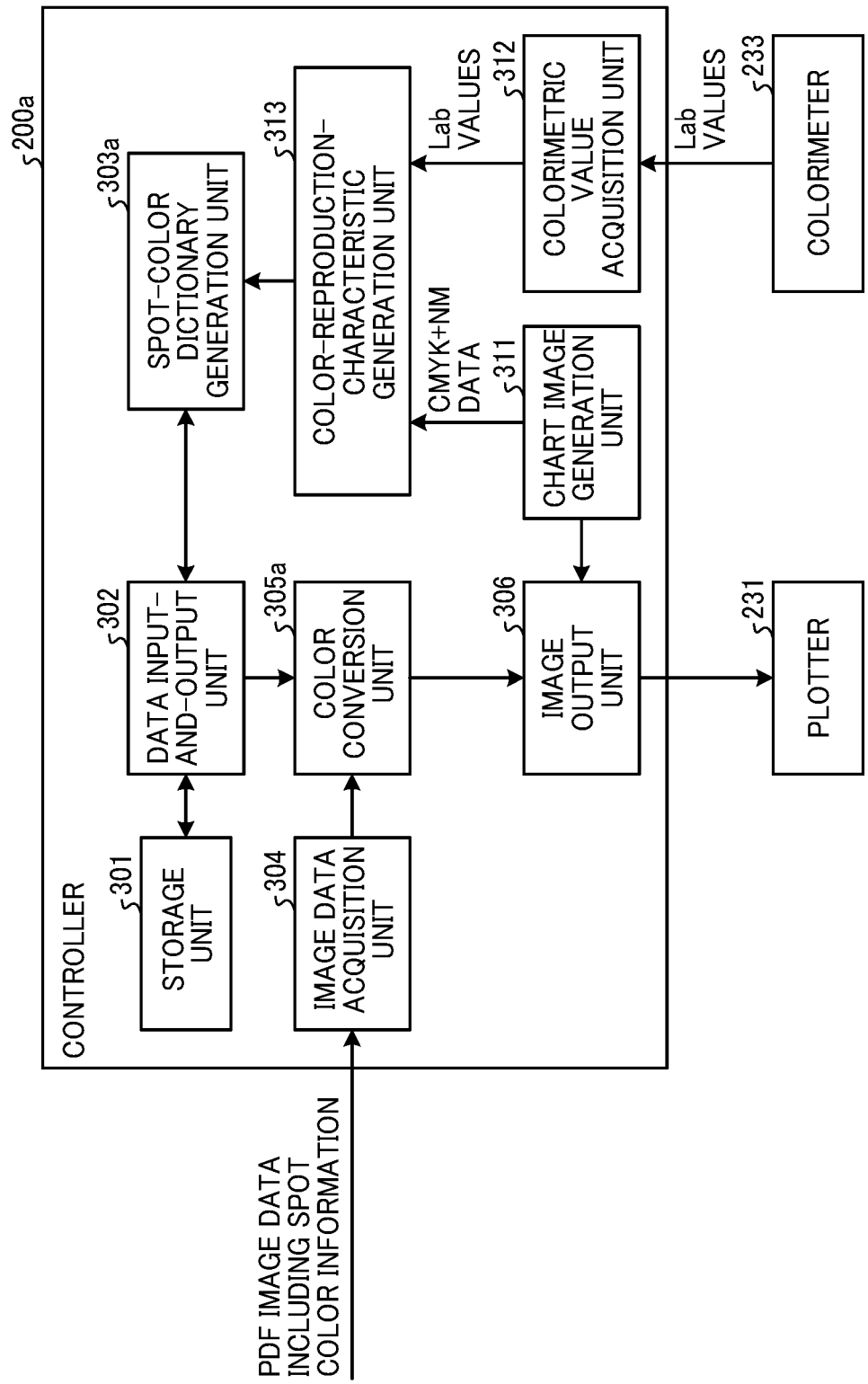
FIG. 13 is a diagram illustrating an example of a configuration of functional blocks of a controller of an image forming apparatus according to a third embodiment of the present disclosure.

Configuration and Operation of Functional Blocks of Controller of Image Forming Apparatus FIG. 13 is a diagram illustrating an example of a configuration of functional blocks of a controller of the image forming apparatus according to the third embodiment. FIG. 14 is a diagram illustrating an example of a spot color dictionary. The configuration and operation of functional blocks in the controller 200a of the image forming apparatus according to the present embodiment are described with reference to FIGS. 13 and 14.

As illustrated in FIG. 13, the controller 200a includes a storage unit 301, a data input-and-output unit 302, a spot-color-dictionary generation unit 303a (second generation unit), an image data acquisition unit 304 (first acquisition unit), a color conversion unit 305a, an image output unit 306, a chart image generation unit 311, a colorimetric value acquisition unit 312 (second acquisition unit), and a color-reproduction-characteristic creation unit 313 (creation unit).

The storage unit 301 is a functional unit that stores a four-color profile and color sample data (color sample information), and stores a spot color dictionary generated by a spot-color-dictionary generation unit 303a, which is described later. The storage unit 301 is implemented by the auxiliary storage device 208 illustrated in FIG. 2.

The data input-and-output unit 302 is a functional unit that reads data from the storage unit 301 and writes data to the storage unit 301. The data input-and-output unit 302 is implemented by, for example, a program executed by the CPU 201 illustrated in FIG. 2.

The spot-color-dictionary generation unit 303a is a functional unit that receives the four-color profile and the color sample data from the storage unit 301 via the data input-and-output unit 302, distributes the device value of magenta (M) (an example of the process color of the same color system as the color system of the spot color) in the target color described in the color sample data, and calculates the device values of magenta (M) and fluorescent magenta (NM) (an example of a spot color and an example of a fluorescent color). The spot-color-dictionary generation unit 303a uses the color reproduction characteristic, in which the device value of the printer (plotter 231) received from the color-reproduction-characteristic creation unit 313 and the color value (colorimetric value of the colorimeter 233) are associated with each other, and the calculated device value of the fluorescent magenta (NM), to calculate a device value for reproducing the Lab value of the target color and generate a spot color dictionary (dictionary).

FIG. 14 illustrates an example of the spot color dictionary (an example of four colors). As illustrated in FIG. 14, in the spot color dictionary, a color name (Colorname) as a spot color and a device value are associated with each other.

The spot-color-dictionary generation unit 303a stores the generated spot color dictionary in the storage unit 301 via the data input-and-output unit 302. The spot-color-dictionary generation unit 303a is implemented by, for example, a program executed in the CPU 201 illustrated in FIG. 2.

The image data acquisition unit 304 is a functional unit that acquires a portable document format (PDF) image (an example of a first image data) in which spot color information is written from the PC 20 or the like via the network N. The image data acquisition unit 304 is implemented by, for example, a program executed in the CPU 201 illustrated in FIG. 2.

The color conversion unit 305a is a functional unit that acquires the PDF image in which the spot color information is written from the image data acquisition unit 304, receives the spot color dictionary from the storage unit 301 via the data input-and-output unit 302, and converts all spot colors used in the PDF image into CMYK+NM values using the spot color dictionary, thereby performing color conversion into five-color CMYK+NM image data (an example of second image data) depending on the printer (plotter 231). The color conversion unit 305a is implemented by, for example, a program executed in the CPU 201 illustrated in FIG. 2.

The image output unit 306 is a functional unit that outputs the five-color CMYK+NM image data converted by the color conversion unit 305a to the printer (plotter 231) and causes the printer to execute printing. The image output unit 306 is implemented by, for example, a program executed in the CPU 201 illustrated in FIG. 2.

The chart image generation unit 311 is a functional unit that holds chart data for obtaining color reproduction characteristics of the printer (plotter 231) and generates the chart data as image data in a PDF format (hereinafter referred to as chart image data). Here, the chart data is data in which each of C, M, Y, K, and NM is combined for each predetermined gradation value, and is data including $6^5=7776$ patches in a case of, for example, gradation values of every 20% per color. The chart image generation unit 311 sends the generated chart image data to the color-reproduction-characteristic creation unit 313 and the image output unit 306. The chart image generation unit 311 is implemented by, for example, a program executed in the CPU 201 illustrated in FIG. 2.

The colorimetric value acquisition unit 312 is a functional unit that acquires colorimetric values (Lab values) measured by the colorimeter 233. The colorimetric value acquisition unit 312 acquires colorimetric values (Lab values) of a non-device-dependent color space (Lab color space) for patches obtained by combining C, M, Y, K, and NM included in the chart image data for each gradation value, based on colorimetry performed by the colorimeter 233 on a recording medium of the chart image data printed out from the plotter 231 by the image output unit 306. The colorimeter 233 may perform colorimetry in response to an operation of the user sliding the colorimeter 233 on the recording medium of the chart image data, or may perform colorimetry in response to detection of output of the chart image data in the printer (plotter 231). The colorimetric value acquisition unit 312 is implemented by, for example, a program executed in the CPU 201 illustrated in FIG. 2.

The color-reproduction-characteristic creation unit 313 is a functional unit that creates color reproduction characteristics that associate the CMYK+NM values of the CMYK+NM chart image data received from the chart image generation unit 311 with the colorimetric values (Lab values) of the chart image data printed out from the plotter 231 and acquired by the colorimetric value acquisition unit 312 with respect to the recording medium. The color-reproduction-characteristic creation unit 313 sends the generated color reproduction characteristics to the spot-color-dictionary generation unit 303a. The color-reproduction-characteristic creation unit 313 is implemented by, for example, a program executed in the CPU 201 illustrated in FIG. 2.

Among the functional units of the controller 200a illustrated in FIG. 13, at least a part of the functional units implemented by software (program) may be implemented by a hardware circuit such as an FPGA or an ASIC.

Each functional unit of the controller 200a illustrated in FIG. 13 conceptually illustrates a function, and is not limited to such a configuration. For example, a plurality of functional units illustrated as independent functional units in the controller 200a illustrated in FIG. 13 may be configured as one functional unit. Alternatively, the function of one functional unit in the controller 200a illustrated in FIG. 13 may be divided into a plurality of functional units.

Spot-Color Dictionary Creation Process

Figure 15:
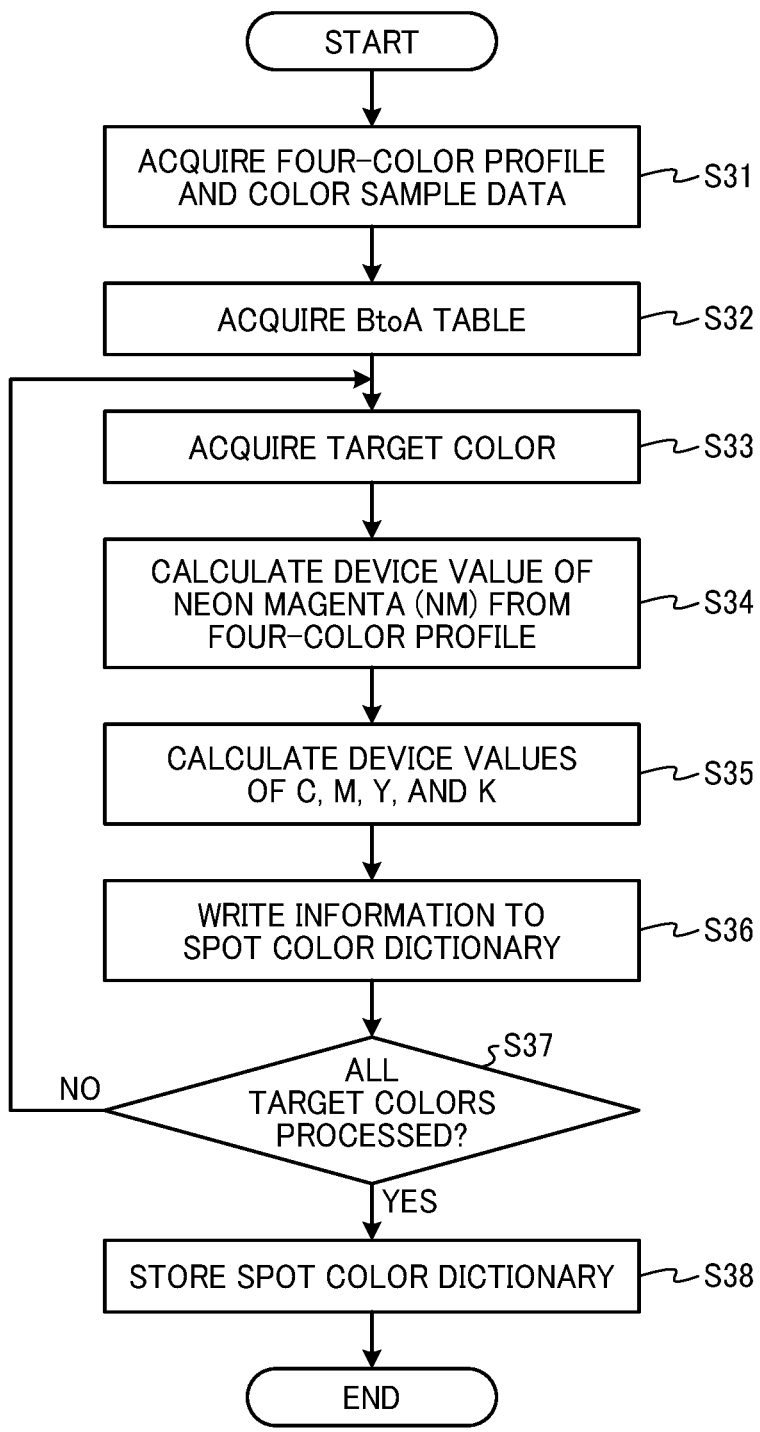
FIG. 15 is a flowchart illustrating an example of a flow of a spot color dictionary creation process of the image forming apparatus according to the third embodiment.

FIG. 15 is a flowchart illustrating an example of a flow of a spot color dictionary creation process of the image forming apparatus according to the third embodiment. The flow of the spot color dictionary creation process of the image forming apparatus according to the present embodiment will be described with reference to FIG. 15.

Step S31

First, the spot-color-dictionary generation unit 303a acquires a four-color profile and color sample data from the storage unit 301 via the data input-and-output unit 302. Then, the process proceeds to S32.

Step S32

The spot-color-dictionary generation unit 303a acquires a BtoA table (for example, see FIG. 5) from the acquired four-color profile. Then, the process proceeds to step S33.

Step S33

The spot-color-dictionary generation unit 303a acquires the Lab value of one target color from the acquired color sample data. Then, the process proceeds to step S34.

Step S34

The spot-color-dictionary generation unit 303a acquires a device value of magenta (M) corresponding to the Lab value of the target color acquired from the color sample data in the acquired four-color profile. The spot-color-dictionary generation unit 303a distributes the acquired device value of magenta (M) and calculates the device values of magenta (M) and fluorescent magenta (NM) in the same manner as the color-conversion-profile generation unit 303 of the first embodiment or the second embodiment. Then, the process proceeds to step S35.

Step S35

The spot-color-dictionary generation unit 303a receives the color reproduction characteristics from the color-reproduction-characteristic creation unit 313, fixes the calculated device value of fluorescent magenta (NM), and calculates the device values of C, M, Y, and K for reproducing the Lab value of the target color using the color reproduction characteristics. Then, the process proceeds to step S36.

Step S36

The spot-color-dictionary generation unit 303a writes information associating the target color with the calculated CMYK+NM value into the spot color dictionary. Then, the process proceeds to step S37.

Step S37

When the processing of steps S33 to S36 has been completed for all the target colors of the color sample data (YES in step S37), the process proceeds to step S38. When the processing has not been completed (NO in step S37), the process returns to step S33.

Step S38

The spot-color-dictionary generation unit 303a generates a spot color dictionary including information in which all target colors are associated with the calculated CMYK+NM values, and stores (saves) the spot color dictionary in the storage unit 301 via the data input-and-output unit 302. Then, the spot color dictionary creation process ends.

Printing Process of Image Forming Apparatus

Figure 16:
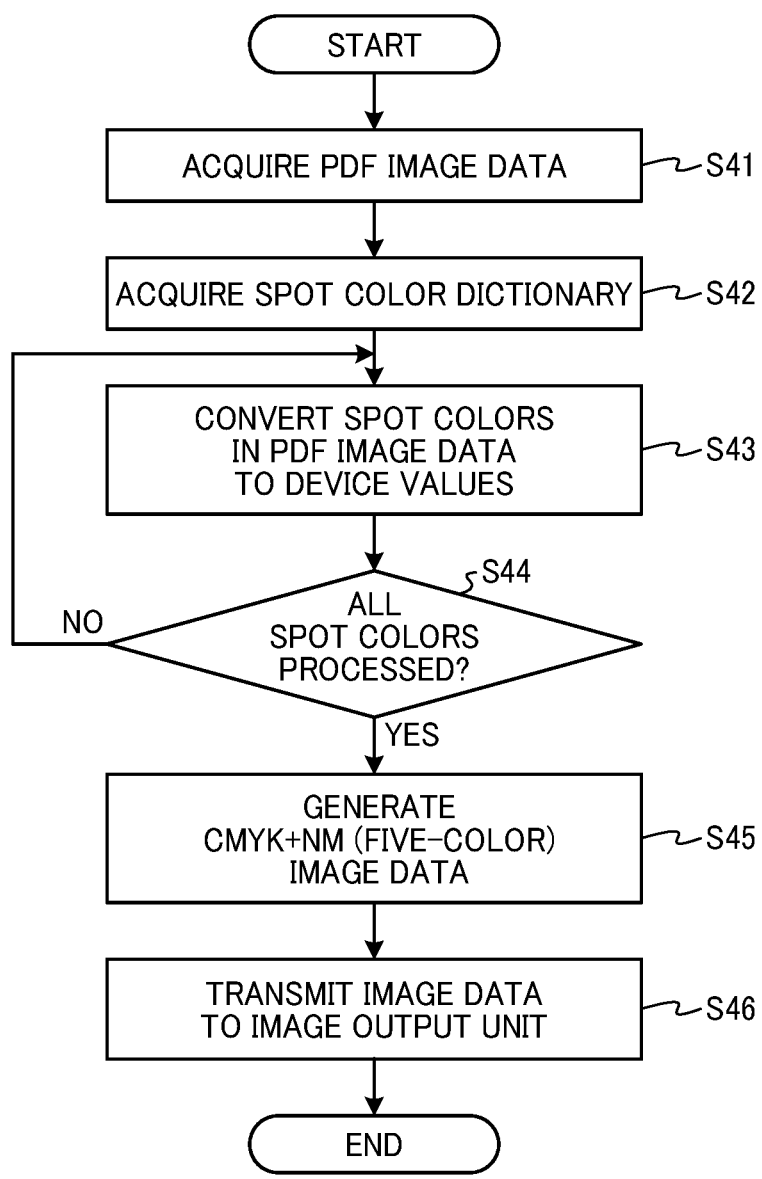
FIG. 16 is a flowchart illustrating an example of a flow of a printing process of the image forming apparatus according to the third embodiment.
Figure 17:
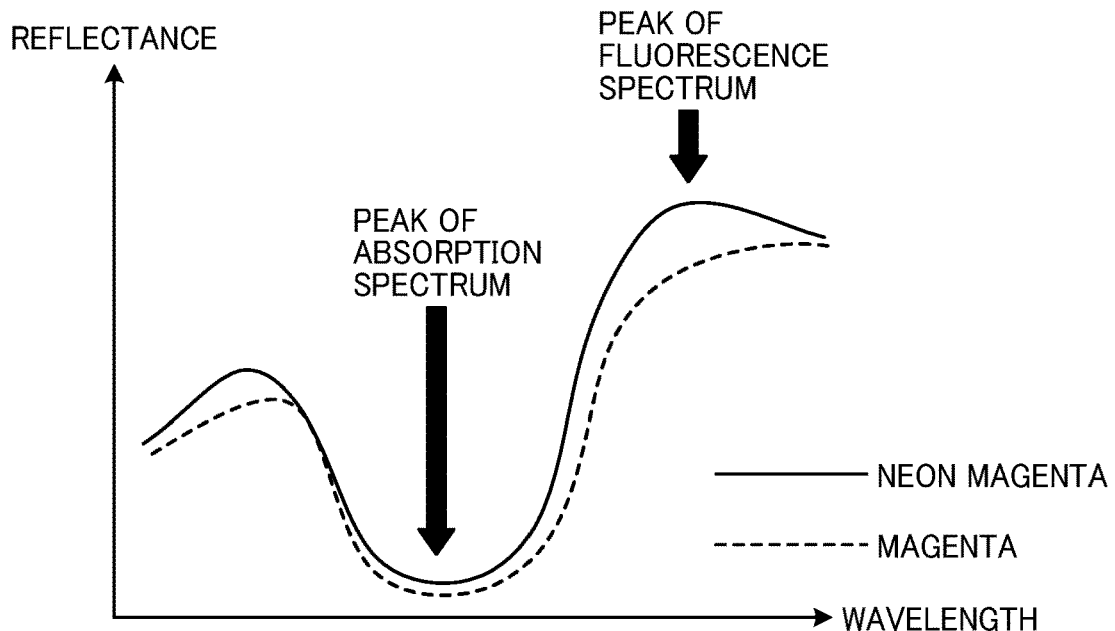
FIG. 17 is a graph of spectral distribution characteristics of fluorescent magenta and process color magenta.

FIG. 16 is a flowchart illustrating an example of a flow of a printing process of the image forming apparatus according to the third embodiment. A flow of a printing process of the image forming apparatus according to the present embodiment is described with reference to FIG. 16.

Step S41

First, when the user performs an operation of executing printing of an image via the operation display device 210, the image data acquisition unit 304 acquires a PDF image in which spot color information is written via the network N. Then, the process proceeds to step S42.

Step S42

The color conversion unit 305a acquires the PDF image data acquired by the image data acquisition unit 304, and acquires the spot color dictionary from the storage unit 301 via the data input-and-output unit 302. Then, the process proceeds to step S43.

Step S43

The color conversion unit 305a converts the spot colors used (described) in the PDF image into CMYK+NM device values (CMYK+NM values) using the acquired spot color dictionary. Then, the process proceeds to step S44.

Step S44

When the conversion processing by the color conversion unit 305a has been completed for all spot colors in the PDF image (YES in step S44), the process proceeds to step S45. When the conversion processing has not been completed (NO in step S44), the process returns to step S43.

Step S45

The color conversion unit 305a converts all spot colors used in the PDF image into CMYK+NM values by step S43 and step S44. Thus, the spot colors are color-converted into five-color CMYK+NM image depending on the printer (plotter 231). Then, the process proceeds to step S46.

Step S46

The color conversion unit 305a sends the generated five-color CMYK+NM image data to the image output unit 306. The image output unit 306 outputs the five-color CMYK+NM image data to the printer (plotter 231) and causes the printer to execute printing.

As described above, in the image forming apparatus according to the present embodiment, the device values of the fluorescent magenta (NM) corresponding to the target color are acquired from the four-color profile and the color sample data by the spot-color-dictionary generation unit 303a. The device values of C, M, Y, and K are calculated using the color reproduction characteristics of the printer to generate the spot color dictionary. The spot colors of the PDF image are converted into the five-color CMYK+NM values by the color conversion unit 305a using the spot color dictionary. Thus, an algorithm for color conversion is constructed, thus facilitating image data to be created when a fluorescent color material is used. Generating the spot color dictionary also allows reproduction of the target colors in the color sample book.

In the present embodiment, the operation of calculating the device values of CMYK from the device values of fluorescent magenta (NM) and the target color by using the color reproduction characteristics has been described. However, the operation of calculating the device values of CMYK is not limited to the above-described operation. For example, the way of inputting black (K) may be set in advance in consideration of graininess. In such a case, the device values of CMY can be calculated from the device values of fluorescent magenta (NM) and black (K) and the target color.

Fourth Embodiment

An image forming apparatus according to a fourth embodiment is described focusing on differences from the image forming apparatus 10 according to the first embodiment. In the first embodiment, an operation has been described in which a five-color profile is easily generated from a four-color profile using a fixed distribution factor, and four-color image data is converted into five-color image data in which fluorescent magenta has been distributed. In the present embodiment, a description is given of an operation of converting the ratio of the device values of magenta and fluorescent magenta using a profile in order to maintain gray representation from the five-color image data. The hardware configuration of the image forming apparatus according to the present embodiment is similar to that described in the first embodiment.

As described above, replacing the process colors with fluorescent color materials of the same color system has the advantage that the colors do not dull. However, it is found that mixing of the replaced fluorescent color materials into gray changes the mixing ratio of the process colors that express gray and deviates from the gray that is desired to be expressed, and in particular, the appearance in a region with low saturation is significantly affected. Since the expression of gray is expressed by the mixture of process colors, numerically accurate reproduction is required. Therefore, it is preferable that the ratio of color mixture of C (cyan), M (magenta), and Y (yellow) (the ratio including the fluorescent color material if the ratio including the fluorescent color material has already been adjusted) is not changed as much as possible. Here, "gray" and "expression of gray" refer not to gray in the meaning of a gray color but to a color and an expression of the color in a color region have low saturations and grayish colors. For example, when a color material of fluorescent magenta is newly used in four-color image data, the ratio of gray in the process colors can be maintained by increasing the ratio of the color mixture of the fluorescent color material in outputting a color other than gray without using the fluorescent color material in outputting gray, with respect to the distribution factor of magenta and fluorescent magenta.

As an outline of the present embodiment, in order to restrain the gray expression of the five-color profile from being unbalanced, the ratio between the device value of magenta and the device value of fluorescent magenta is changed based on the saturation, and the device values of magenta and fluorescent magenta are calculated. In the controller of the image forming apparatus according to the present embodiment, an operation of color-converting five-color CMYK+NM image data into five-color CM'YK+NM' image data having different device values of M and NM is described as an example. Note that embodiments of the present disclosure are not limited to color conversion from five-color image data to five-color image data, and the present embodiment is also applicable to color conversion from four-color image data to five-color image data.

Although details are described later, in the present embodiment, changing the ratio between the device value of magenta and the device value of fluorescent magenta based on the saturation is performed as follows, for example.

The device values before the change are set as follows.
Device value of magenta before change: m
Device value of fluorescent magenta before change: n
($0 \leq m \leq 100$, $0 \leq n \leq 100$)
The changed device values are calculated as follows.
Device value of magenta after change: $m - m \times \gamma$
Device value of fluorescent magenta after change: $n + m \times \gamma$
($0 \leq \gamma \leq 1$)

Here, $\gamma$ is a value based on the saturation and is a value that is zero when the saturation is low and increases when the saturation is high.

The device values after the change may be calculated as follows.
Device value of magenta after change: $m - x\gamma$
Device value of fluorescent magenta after change: $n + m \times \gamma + \beta$
($0 < \gamma < 1$, $\beta$: any given value)

Hereinafter, a case in which the device value of magenta after the change is calculated as $m - m \times \gamma$ and the device value of fluorescent magenta after the change is calculated as $n + m \times \gamma$ is described as an example.

Figure 18:
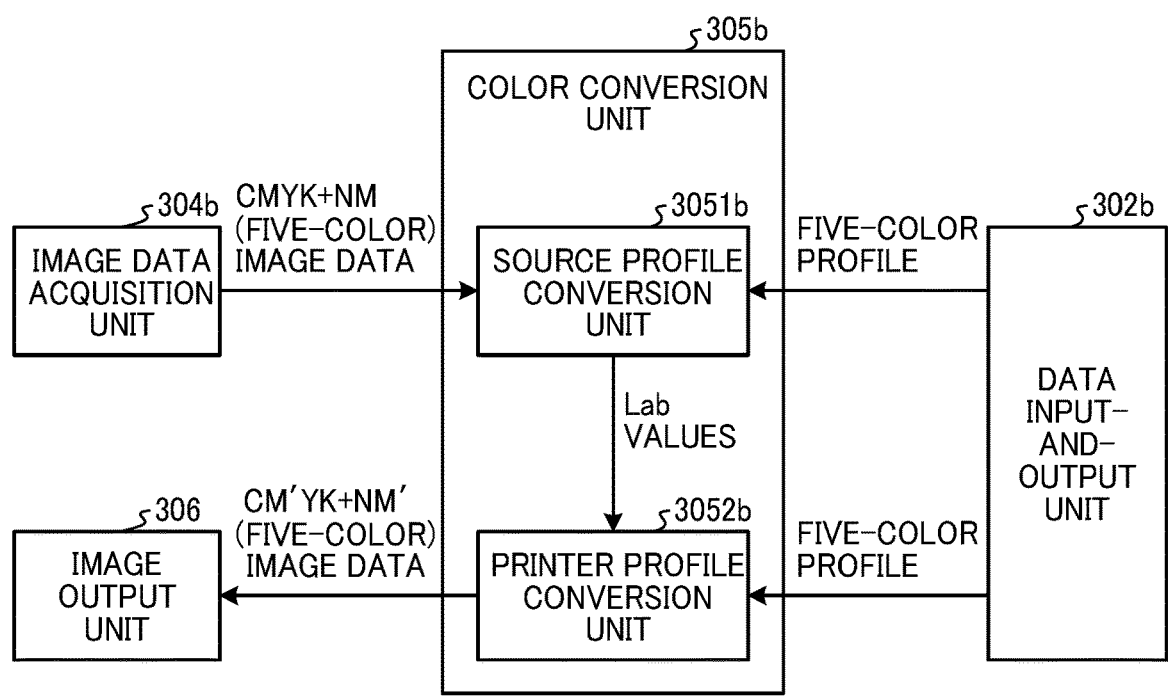
FIG. 18 is a diagram illustrating an example of a configuration of functional blocks of a color conversion unit of a controller of an image forming apparatus according to a fourth embodiment of the present disclosure.
Figure 23:
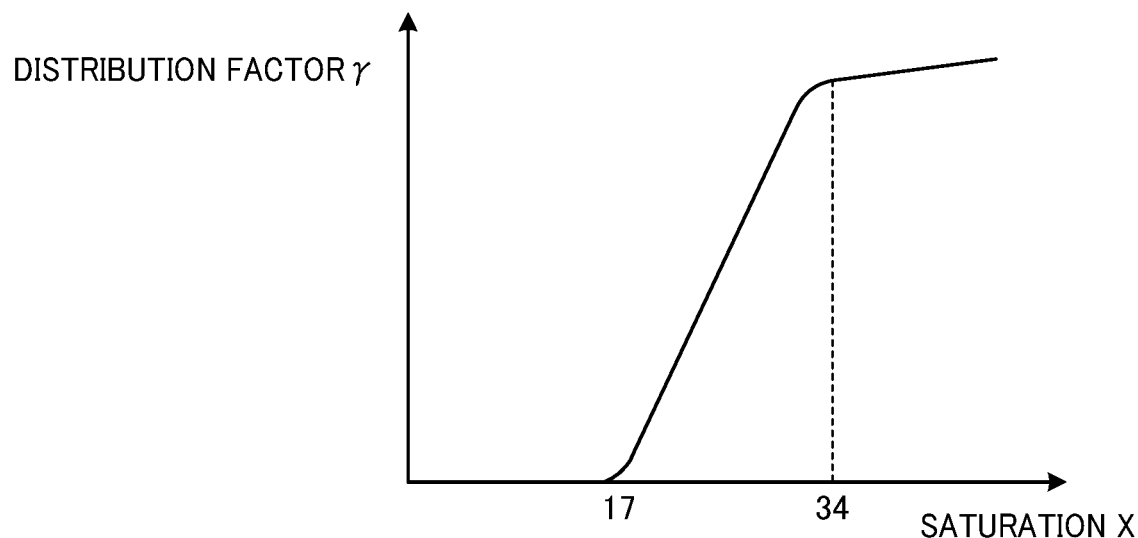
FIG. 23 is a graph illustrating an example of a relationship between saturation and distribution factor.
Figure 24:
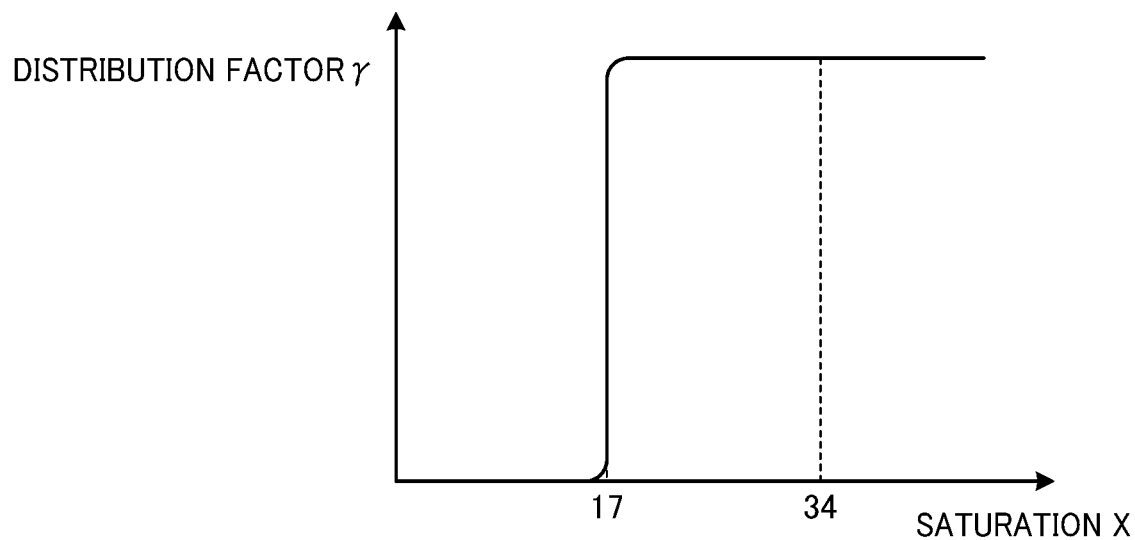
FIG. 24 is a graph illustrating another example of the relationship between saturation and distribution factor.

Configuration and Operation of Functional Blocks of Controller of Image Forming Apparatus FIG. 18 is a diagram illustrating an example of a configuration of functional blocks of a color conversion unit of the controller of the image forming apparatus according to the fourth embodiment. FIG. 19 is a diagram illustrating an example of a BtoA table of a pre-change five-color profile. FIG. 20 is a diagram illustrating an example of a BtoA table of a post-change five-color profile. FIG. 21 is a diagram illustrating an example of an AtoB table of a pre-change five-color profile. FIG. 22 is a diagram illustrating an example of an AtoB table of a post-change five-color profile. FIG. 23 is a graph illustrating an example of a relationship between saturation and distribution factor. FIG. 24 is a graph illustrating another example of the relationship between saturation and distribution factor. The configuration and operation of the controller of the image forming apparatus according to the present embodiment are described with reference to FIGS. 18 to 24.

The controller 200 of the image forming apparatus 10 according to the present embodiment includes a data input-and-output unit 302b, an image data acquisition unit 304b, and a color conversion unit 305b instead of the data input-and-output unit 302, the image data acquisition unit 304, and the color conversion unit 305, respectively, in the configuration illustrated in FIG. 3.

The storage unit 301 is a functional unit that stores an ICC profile of five colors before the ratio of the device values of magenta and fluorescent magenta is changed (hereinafter referred to as a pre-change five-color profile), an ICC profile of five colors after the ratio of the device values of magenta and fluorescent magenta generated by the color-conversion-profile generation unit 303 is changed (hereinafter referred to as a post-change five-color profile), and the like. The storage unit 301 is implemented by the auxiliary storage device 208 illustrated in FIG. 2.

The data input-and-output unit 302b is a functional unit that reads data from the storage unit 301 and writes data to the storage unit 301. The data input-and-output unit 302b is implemented by, for example, a program executed in the CPU 201 illustrated in FIG. 2.

The color-conversion-profile generation unit 303 (third generation unit) is a functional unit that receives the pre-change five-color profile from the storage unit 301 via the data input-and-output unit 302b, calculates the device values of magenta (M) and fluorescent magenta (NM) by changing the ratio of the device values of magenta (M) (an example of the process color of the same color system as the color system of the fluorescent color) and fluorescent magenta (NM) (an example of the fluorescent color), and generates the post-change five-color profile.

FIG. 19 illustrates a BtoA table of the pre-change five-color profile. In the present embodiment, in order to generate the post-change five-color profile, the color-conversion-profile generation unit 303 changes the ratio of the device values of magenta (M) and fluorescent magenta (NM) of the pre-change five-color profile acquired from the storage unit 301 via the data input-and-output unit 302b, and assigns the distribution factor when calculating the device values of magenta (M) and fluorescent magenta (NM). In other words, when the CMYK+NM values corresponding to the Lab values (Lab grid points) described in the BtoA table of the pre-change five-color profile as the printer profile are C=c ($0 \leq c \leq 100$), Y=y ($0 \leq y \leq 100$), and K=k ($0 \leq k \leq 100$), the color-conversion-profile generation unit 303 changes only the ratio of the device values of magenta (M) and fluorescent magenta (NM), and calculates the device values of magenta (M) and fluorescent magenta (NM) as C=c, M=m−m×γ(m−n×γ>0), Y=y, K=k, and NM=n+m×γ using the distribution factor γ based on the saturation. Here, the distribution factor γ has a value of $0 \leq \gamma \leq 1$ and is a ratio determined based on the saturation X directly obtained from the Lab values (specifically, a and b of the Lab values). For example, the distribution factor γ may be determined to be a value that decreases as the saturation decreases (increases as the saturation increases) at least in a predetermined range of the saturation. For example, when the saturation X obtained from a and b among the Lab values is 17 or less (that is, when the saturation is low), the distribution factor γ is zero (γ=0, in other words, no distribution is performed). When the saturation X is 34 or more (that is, when the saturation is high), the distribution factor γ is nearly equal to one (γ≈1). When the saturation X is in a range of 17<X<34, the distribution factor γ is, for example, a value as illustrated in FIG. 23. Note that the value of the distribution factor γ in FIG. 23 is an example, and may be a value as illustrated in FIG. 24. In other words, the distribution factor γ may be set to zero when the saturation is less than a predetermined saturation X (for example, 17), and the distribution factor γ may be set to one when the saturation is greater than the predetermined saturation X. The color-conversion-profile generation unit 303 changes the ratio of the device values of magenta (M) and fluorescent magenta (NM) described above for all the Lab values (Lab grid points) in the BtoA table of the pre-change five-color profile, and calculates the device values of magenta (M) and fluorescent magenta (NM). The color-conversion-profile generation unit 303 sets the CMYK+NM values corresponding to the respective Lab values (Lab grid points), thereby generating the BtoA table of the post-change five-color profile illustrated in FIG. 20. In FIGS. 19 and 20, $m_{max}$ and $n_{max}$ are, for example, "100".

Similarly, the color-conversion-profile generation unit 303 calculates the device values of magenta (M) and fluorescent magenta (NM) for each of the CMYK+NM values (CMYK+NM grid points) described in the AtoB table of the pre-change five-color profile as the source profile illustrated in FIG. 21, similarly to the BtoA table described above. The color-conversion-profile generation unit 303 generates the AtoB table of the post-change five-color profile illustrated in FIG. 22.

Here, the color-conversion-profile generation unit 303 rewrites only the device values in both the BtoA table and the AtoB table, and does not rewrite the Lab values constituting the PCS. The color-conversion-profile generation unit 303 rewrites a necessary tag.

The color-conversion-profile generation unit 303 stores the generated five-color profile in the storage unit 301 via the data input-and-output unit 302b. The color-conversion-profile generation unit 303 is implemented by, for example, a program executed in the CPU 201 illustrated in FIG. 2.

The image data acquisition unit 304b is a functional unit that acquires CMYK+NM image data (an example of first image data) from the PC 20 or the like via the network N, for example. The image data acquisition unit 304b sends the acquired CMYK+NM image data to the color conversion unit 305b. The image data acquisition unit 304b is implemented by, for example, a program executed in the CPU 201 illustrated in FIG. 2.

The color conversion unit 305b is a functional unit that acquires the CMYK+NM image from the image data acquisition unit 304b, acquires the five-color profile from the storage unit 301 via the data input-and-output unit 302b, and converts the acquired five-color CMYK+NM image data into five-color CM'YK+NM' image data (an example of second image data) depending on the printer (plotter 231) using the acquired five-color profile. As the CMYK+NM image data and the CM'YK+NM' image data, for example, color data generated by changing device values of C, M, Y, K, and NM in a range of 0 to 100 may be used.

As illustrated in FIG. 18, the color conversion unit 305b includes a source profile conversion unit 3051b and a printer profile conversion unit 3052b.

The source profile conversion unit 3051b is a functional unit that acquires the pre-change five-color profile (AtoB table) from the storage unit 301 via the data input-and-output unit 302b, and converts the CMYK+NM values of the pixels constituting the five-color CMYK+NM image acquired from the image data acquisition unit 304b into Lab values using the pre-change five-color profile. The source profile conversion unit 3051b sends the converted Lab values to the printer profile conversion unit 3052b.

The printer profile conversion unit 3052b is a functional unit that acquires the post-change five-color profile (BtoA table) from the storage unit 301 via the data input-and-output unit 302b, and converts the Lab values received from the source profile conversion unit 3051b into five-color CM'YK+NM' image data including CM'YK+NM' values using the post-change five-color profile. The printer profile conversion unit 3052b sends the converted five-color CM'YK+NM' image data to the image output unit 306.

The color conversion unit 305b is implemented by, for example, a program executed in the CPU 201 illustrated in FIG. 2.

The image output unit 306 is a functional unit that outputs the CM'YK+NM' image data converted by the color conversion unit 305b to the printer (plotter 231) and causes the printer to execute printing. The image output unit 306 is implemented by, for example, a program executed in the CPU 201 illustrated in FIG. 2.

Among the functional units of the controller 200 according to the present embodiment, at least a part of the functional units implemented by software (program) may be implemented by a hardware circuit such as an FPGA or an ASIC.

Each functional unit of the controller 200 according to the present embodiment conceptually illustrates a function, and is not limited to such a configuration. For example, a plurality of functional units illustrated as independent functional units in the controller 200 may be configured as one functional unit. Alternatively, the function of one functional unit in the controller 200 may be divided into a plurality of functional units.

Five-Color Profile Generation Process

Figure 25:
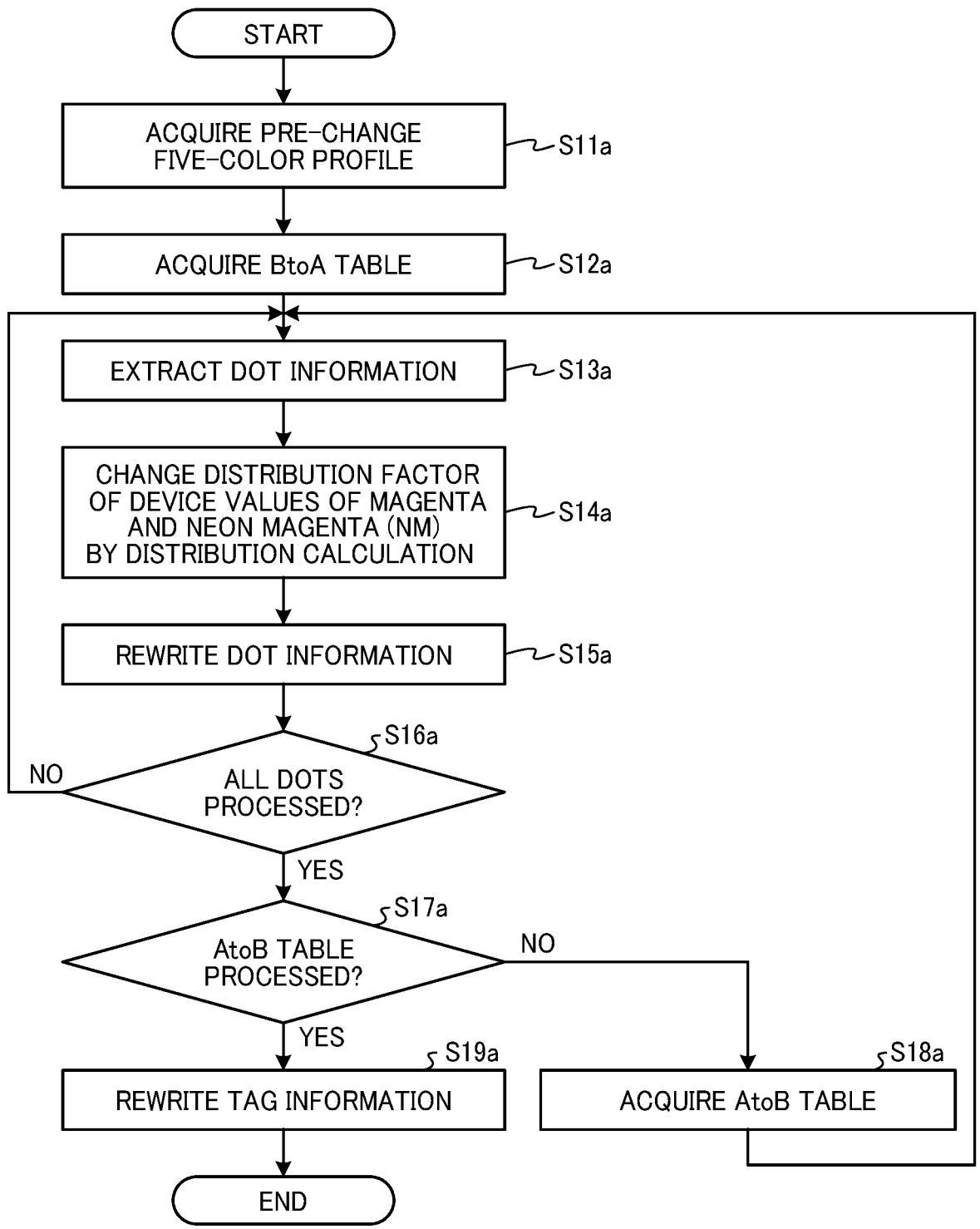
FIG. 25 is a flowchart illustrating an example of a flow of a process of generating a post-change five-color profile in the image forming apparatus according to the fourth embodiment.

FIG. 25 is a flowchart illustrating an example of a flow of a process of generating a changed five-color profile in the image forming apparatus according to the fourth embodiment. With reference to FIG. 25, a flow of a post-change five-color profile generation process of the image forming apparatus 10 according to the present embodiment is described.

Step S11a

First, the color-conversion-profile generation unit 303 acquires the pre-change five-color profile (first profile) from the storage unit 301 via the data input-and-output unit 302b. Then, the process proceeds to step S12a.

Step S12a

The color-conversion-profile generation unit 303 acquires a BtoA table (for example, see FIG. 19) from the acquired pre-change five-color profile. Then, the process proceeds to step S13a.

Step S13a

The color-conversion-profile generation unit 303 extracts CMYK+NM values as dot information from the BtoA table of the acquired pre-change five-color profile. Then, the process proceeds to step S14a.

Step S14a

The color-conversion-profile generation unit 303 changes the ratio of the device values of magenta (M) and fluorescent magenta (NM) among the extracted CMYK+NM values in the manner described above and calculates the device values of magenta (M) and fluorescent magenta (NM). Then, the process proceeds to step S15a.

Step S15a

The color-conversion-profile generation unit 303 rewrites, for example, the CMYK+NM values of the BtoA table of the acquired pre-change five-color profile with the CM'YK+NM' values including the calculated device values of magenta (M) and fluorescent magenta (NM). Then, the process proceeds to step S16a.

Step S16a

When the processing of steps S13a to S15a is completed for all the CMYK+NM values (dot information) in the BtoA table of the pre-change five-color profile acquired by the color-conversion-profile generation unit 303 (YES in step S16a), the process proceeds to step S17a. When the processing is not completed (NO in step S16a), the process returns to step S13a. When the processing of steps S13a to S15a is completed for all CMYK+NM values (dot information) in the BtoA table of the pre-change five-color profile acquired by the color-conversion-profile generation unit 303, the BtoA table of the post-change five-color profile is generated.

Step S17a

If the processing of step S13a to step S16a has already been performed for the AtoB table of the pre-change five-color profile (YES in step S17a), the process proceeds to step S19a. If the processing has not been performed yet (NO in step S17a), the process proceeds to step S18a.

Step S18a

The color-conversion-profile generation unit 303 acquires an AtoB table (for example, see FIG. 21) from the acquired pre-change five-color profile. Then, the process returns to step S13a.

Step S19a

The color-conversion-profile generation unit 303 changes tag information such as the date of the post-change five-color profile as necessary. With respect to the BtoA table and the AtoB table of the pre-change five-color profile, when the BtoA table and the AtoB table of the post-change five-color profile (second profile) are generated by the color-conversion-profile generation unit 303, the generation processing of the post-change five-color profile is ended.

Color Conversion Process of Printing Process of Image Forming Apparatus

Figure 26:
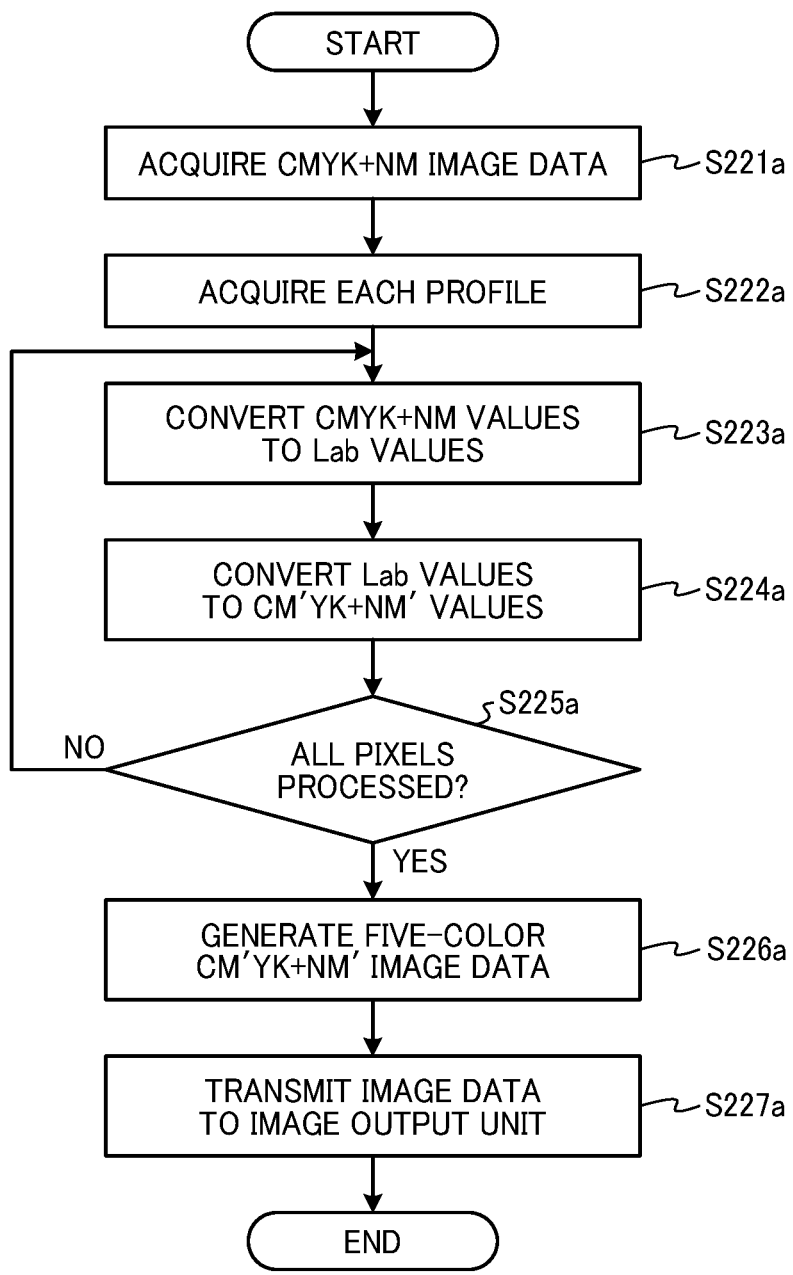
FIG. 26 is a flowchart illustrating an example of a flow of a color conversion process in a printing process of the image forming apparatus according to the fourth embodiment.

FIG. 26 is a flowchart illustrating an example of a color conversion process in a printing process of the image forming apparatus according to the fourth embodiment. The color conversion process illustrated in FIG. 26 corresponds to the process of step S22 illustrated in FIG. 10 (color conversion process illustrated in FIG. 11) in the first embodiment described above. A flow of the color conversion process in the printing process of the image forming apparatus 10 according to the present embodiment is described with reference to FIG. 26. It is assumed that the five-color profile (BtoA table) illustrated in FIG. 25 is generated in advance and stored in the storage unit 301.

Step S221a

The source profile conversion unit 3051b of the color conversion unit 305b acquires the five-color CMYK+NM image data acquired by the image data acquisition unit 304b. Then, the process proceeds to step S222a.

Step S222a

The source profile conversion unit 3051b acquires the pre-change five-color profile from the storage unit 301 via the data input-and-output unit 302b. The printer profile conversion unit 3052b of the color conversion unit 305b acquires the post-change five-color profile from the storage unit 301 via the data input-and-output unit 302b. Then, the process proceeds to step S223a.

Step S223a

Next, the source profile conversion unit 3051b converts the CMYK+NM values of the pixels constituting the acquired five-color CMYK+NM image data into Lab values by using the acquired pre-change five-color profile (AtoB table). The source profile conversion unit 3051b sends the converted Lab values to the printer profile conversion unit 3052b. Then, the process proceeds to step S224a.

Step S224a

The printer profile conversion unit 3052b converts the Lab values received from the source profile conversion unit 3051b into CM'YK+NM' values using the acquired post-change five-color profile (BtoA table), and replaces the target CMYK+NM values with the CM'YK+NM' values in the five-color CMYK+MN image data. Then, the process proceeds to step S225a.

Step S225a

If the conversion and replacement to the CM'YK+NM' values have been performed for all the pixels of the pre-conversion five-color CMYK+NM image data (YES in step S225a), the process proceeds to step S226a. If the processing has not been completed for all the pixels (NO in step S225a), the process returns to step S223a.

Step S226a

The printer profile conversion unit 3052b generates, as the post-conversion five-color CM'YK+NM' image data, image data in which all of the CMYK+NM values of the pixels constituting the pre-conversion five-color CMYK+NM image data have been replaced with the CM'YK+NM' values whose ratio of the device values of magenta (M) and fluorescent magenta (NM) has been changed. The CM'YK+NM' values constituting the post-conversion five-color CM'YK+NM' image data are device values dependent on the printer (plotter 231). Then, the process proceeds to step S227a.

Step S227a

The printer profile conversion unit 3052b sends the generated post-conversion five-color CM'YK+NM' image data to the image output unit 306. Then, the color conversion process ends.

As described above, in the image forming apparatus 10 according to the present embodiment, the color-conversion-profile generation unit 303 generates the ratio-changed five-color profile from the pre-change five-color profile. The color conversion unit 305b converts the five-color CMYK+

NM image data into the Lab values by the pre-change five-color profile, and the Lab values are converted into the CM'YK+NM' values by the post-change five-color profile. Accordingly, the pre-change five-color CMYK+NM image data are converted into the five-color CM'YK+NM' image data whose ratio of the device values of magenta (M) and fluorescent magenta (NM) have been changed. Thus, an algorithm for color conversion is constructed, and the imbalance of gray in the case of using the fluorescent color material is restrained, and the creation of image data having color vividness which is an advantage of the fluorescent color material can be obtained.

In the above-described embodiment, the ratio of the device values of magenta (M) and fluorescent magenta (NM) in the pre-change five-color profile is changed, the device value of fluorescent magenta as the fluorescent color material is calculated, and the post-change five-color profile is generated. However, the way of generating the post-change five-color profile is not limited to the above-described example. For example, the ratio of the device values of cyan (C) and fluorescent cyan (NC) or yellow and fluorescent yellow (NY) of the pre-change five-color profile may be changed, and each device value may be calculated to generate the post-change five-color profile.

As described above, even when the four-color image data is input, using the four-color profile (AtoB table) instead of the pre-change five-color profile (AtoB table) allows to convert the four-color image data into the five-color image data while preventing the gray balance from being lost.

Fifth Embodiment

An image forming apparatus according to a fifth embodiment is described focusing on differences from the image forming apparatus 10 according to the fourth embodiment. In the fourth embodiment, the operation is described above of converting the ratio of the device values of magenta and fluorescent magenta using a profile in order to maintain gray representation from the five-color image data. In the present embodiment, a description is given of an operation of converting the ratio of the device values of magenta and fluorescent magenta without using a profile in order to maintain gray representation from the five-color image data. The hardware configuration of the image forming apparatus according to the present embodiment is similar to that described in the first embodiment.

As an outline of the present embodiment, in order to restrain the gray expression of the five-color profile from being unbalanced, the ratio between the device value of magenta and the device value of fluorescent magenta is changed based on the saturation without using a profile, and the device values of magenta and fluorescent magenta are calculated. In the controller of the image forming apparatus according to the present embodiment, an operation of color-converting five-color CMYK+NM image data into five-color CM'YK+NM' image data having different device values of M and NM is described as an example. Note that embodiments of the present disclosure are not limited to color conversion from five-color image data to five-color image data, and the present embodiment is also applicable to color conversion from four-color image data to five-color image data.

Figure 27:
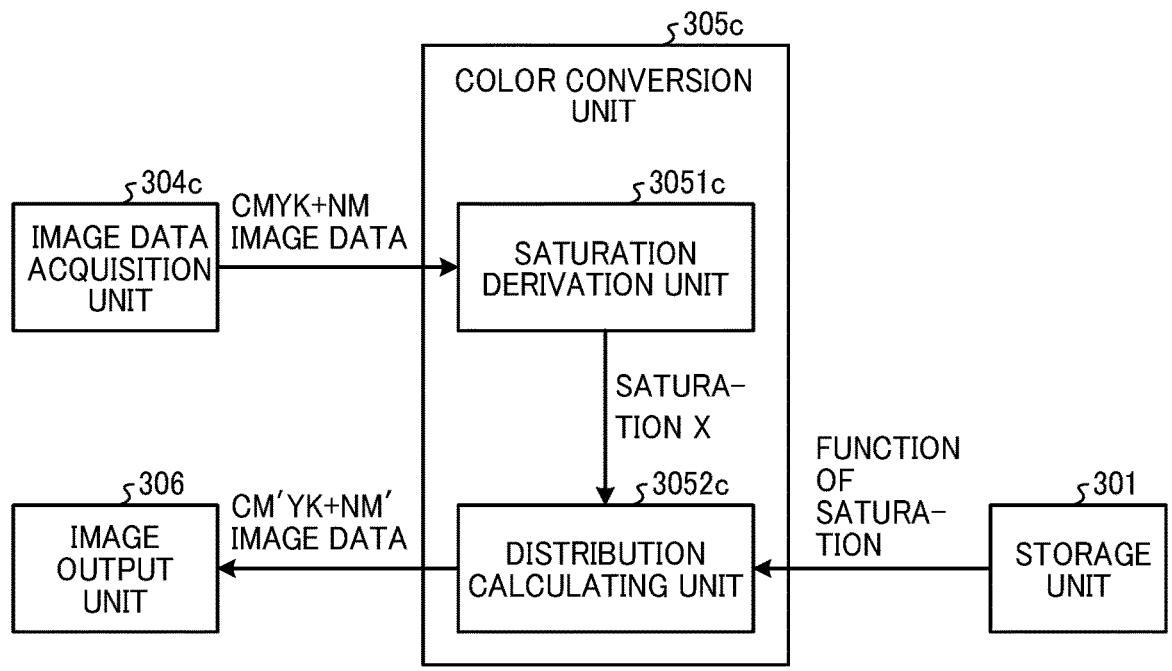
FIG. 27 is a diagram illustrating an example of a configuration of functional blocks of a color conversion unit of a controller of the image forming apparatus according to a fifth embodiment of the present disclosure.

Configuration and Operation of Functional Blocks of Controller of Image Forming Apparatus FIG. 27 is a diagram illustrating an example of a configuration of functional blocks of a color conversion unit of the controller of the image forming apparatus according to the fifth embodiment. The configuration and operation of the controller of the image forming apparatus according to the present embodiment are described with reference to FIG. 27.

The controller 200 of the image forming apparatus 10 according to the present embodiment does not include the data input-and-output unit 302 and the color-conversion-profile generation unit 303 in the configuration illustrated in FIG. 3 described above, and includes an image data acquisition unit 304c and a color conversion unit 305c instead of the image data acquisition unit 304 and the color conversion unit 305, respectively.

The storage unit 301 is a functional unit that stores information of a function of the saturation X and the distribution factor $\gamma$ as illustrated in FIG. 23 or 24, for example. The storage unit 301 is implemented by the auxiliary storage device 208 illustrated in FIG. 2.

The image data acquisition unit 304c is a functional unit that acquires CMYK+NM image data (an example of first image data) from the PC 20 or the like via the network N, for example. The image data acquisition unit 304c sends the acquired CMYK+NM image data to the color conversion unit 305c. The image data acquisition unit 304c is implemented by, for example, a program executed in the CPU 201 illustrated in FIG. 2.

The color conversion unit 305c is a functional unit that acquires the CMYK+NM image data from the image data acquisition unit 304c and performs color conversion on the acquired five-color CMYK+NM image data into five-color CM'YK+NM' image data (an example of second image data) depending on the printer (plotter 231). As the CMYK+NM image data and the CM'YK+NM' image data, color data generated by changing the device value of each of C, M, Y, K, and NM in a range of 0 to 100 is used.

As illustrated in FIG. 27, the color conversion unit 305c includes a saturation deriving unit 3051c and a distribution calculating unit 3052c.

Figure 28:
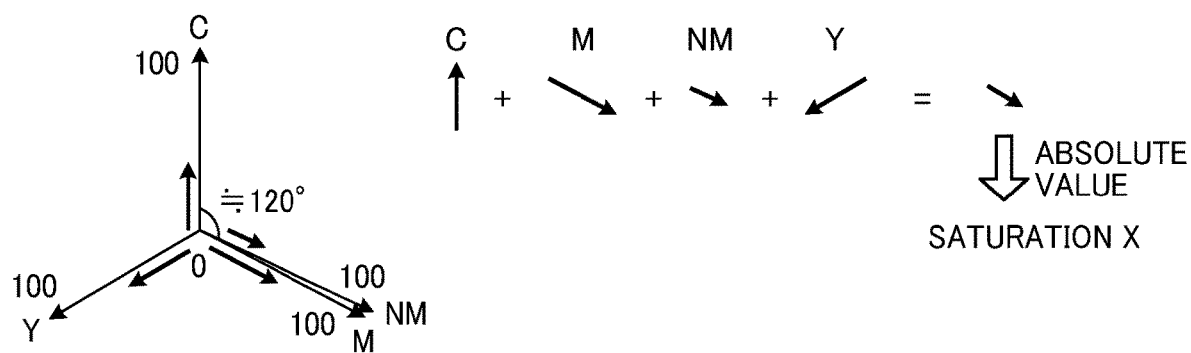
FIG. 28 is a diagram illustrating an operation of deriving saturation from cyan, magenta, yellow, and fluorescent magenta.

The saturation deriving unit 3051c is a functional unit that derives the saturation X from the CMYK+NM values of the pixels constituting the five-color CMYK+NM image acquired from the image data acquisition unit 304c. FIG. 28 illustrates a state in which points of C, M, Y, and NM where the device value is 0% (paper white) and the device value is 100% (solid) are plotted on the hue plane. C, M, and Y have an angle difference of about 120 degrees as a hue angle, and NM has a hue angle substantially equal to a hue angle of M. Therefore, the saturation X can be obtained from the absolute value of $c+(m+n)\times\cos 2\pi/3+y\times\cos 4\pi/3$ using, for example, the device value c of C, the device value m of M, the device value y of Y, and the device value n of NM. That is, the saturation X is calculated from the following equation (1).

$$X=|c+(m+n)\times\cos 2\pi/3+y\times\cos 4\pi/3| \quad (1)$$

The reason why the saturation X is obtained by the above equation (1) is that when c=m=y, the color is approximately gray, and similarly, when c=(m+n)=y and the color is gray, it is necessary to change the ratio based on the saturation and maintain the ratio of fluorescent magenta (NM). Therefore, the saturation deriving unit 3051c derives the saturation X from the CMYK+NM values of the pixels constituting the five-color CMYK+NM image data acquired from the image data acquisition unit 304c by calculating, for example, the above-described equation (1). The saturation deriving unit 3051c sends the derived saturation X and the five-color CMYK+NM image data to the distribution calculating unit 3052c.

The distribution calculating unit 3052c is a functional unit that calculates the distribution factor γ from the saturation X derived by the saturation deriving unit 3051c. To be specific, the distribution calculating unit 3052c reads information of a function of the saturation X and the distribution factor γ as illustrated in FIG. 23 or 24, for example, stored in the storage unit 301, and calculates the distribution factor γ from the saturation X acquired from the saturation deriving unit 3051c based on the function. The distribution calculating unit 3052c changes only the ratio of the device values of magenta (M) and fluorescent magenta (NM) among the acquired five-color CMYK+NM image data, and calculates the device values of magenta (M) and fluorescent magenta (NM) using the calculated distribution factor γ as C=c, M=m−m×γ, Y=y, K=k, and NM=n+m×γ. Thus, the acquired five-color CMYK+NM image data are converted to the five-color CM'YK+NM' image data including CM'YK+NM' values. The distribution calculating unit 3052c sends the converted five-color CM'YK+NM' image data to the image output unit 306.

The color conversion unit 305c is implemented by, for example, a program executed in the CPU 201 illustrated in FIG. 2.

The image output unit 306 is a functional unit that outputs the CM'YK+NM' image data converted by the color conversion unit 305c to the printer (plotter 231) and causes the printer to execute printing. The image output unit 306 is implemented by, for example, a program executed in the CPU 201 illustrated in FIG. 2.

Among the functional units of the controller 200 according to the present embodiment, at least a part of the functional units implemented by software (program) may be implemented by a hardware circuit such as an FPGA or an ASIC.

Each functional unit of the controller 200 according to the present embodiment conceptually illustrates a function, and is not limited to such a configuration. For example, a plurality of functional units illustrated as independent functional units in the controller 200 may be configured as one functional unit. Alternatively, the function of one functional unit in the controller 200 may be divided into a plurality of functional units. For example, the saturation deriving unit 3051c and the distribution calculating unit 3052c may be integrated into one image processing unit.

Color Conversion Process of Printing Process of Image Forming Apparatus

Figure 29:
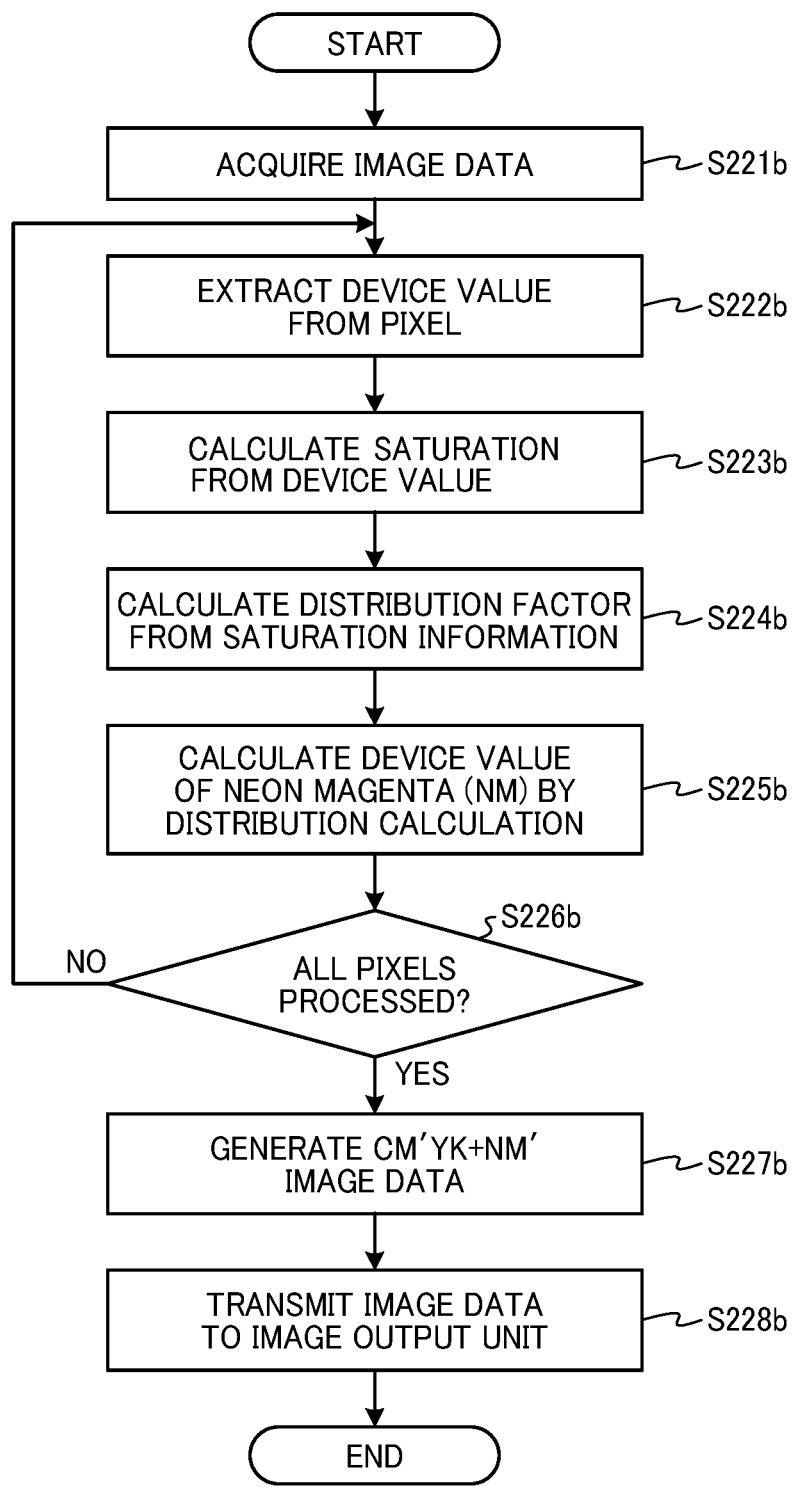
FIG. 29 is a flowchart illustrating an example of a color conversion process in a printing process of the image forming apparatus according to the fifth embodiment.

FIG. 29 is a flowchart illustrating an example of a color conversion process in a printing process of the image forming apparatus according to the fifth embodiment. The color conversion process illustrated in FIG. 29 corresponds to the process of step S22 illustrated in FIG. 10 (color conversion process illustrated in FIG. 11) in the first embodiment described above. A flow of the color conversion process in the printing process of the image forming apparatus 10 according to the present embodiment is described with reference to FIG. 29.

Step S221b

The saturation deriving unit 3051c of the color conversion unit 305c acquires the five-color CMYK+NM image acquired by the image data acquisition unit 304c. Then, the process proceeds to step S222b.

Step S222b

The saturation deriving unit 3051c extracts a device value (CMYK+NM value) of a target pixel from the acquired five-color CMYK+NM image data. Then, the process proceeds to step S223b.

Step S223b

The saturation deriving unit 3051c derives the saturation X from the extracted CMYK+NM values by, for example, calculating the above-described expression (1). The saturation deriving unit 3051c sends the derived saturation X and the five-color CMYK+NM image data to the distribution calculating unit 3052c. Note that the saturation deriving unit 3051c may need to send the five-color CMYK+NM image data to the distribution calculating unit 3052c once. Then, the process proceeds to step S224b.

Step S224b

The distribution calculating unit 3052c calculates the distribution factor γ from the saturation X derived by the saturation deriving unit 3051c. To be specific, the distribution calculating unit 3052c reads information of a function of the saturation X and the distribution factor γ as illustrated in FIG. 23 or 24, for example, stored in the storage unit 301, and calculates the distribution factor γ from the saturation X acquired from the saturation deriving unit 3051c based on the function. Then, the process proceeds to step S225b.

Step S225b

The distribution calculating unit 3052c calculates the device values of magenta (M) and fluorescent magenta (NM) using the calculated distribution factor γ as C=c, M=m−m×γ, Y=y, K=k, and NM=n+m×γ, changes only the ratio of the device values of magenta (M) and fluorescent magenta (NM), converts the target CMYK+NM values into CM'YK+NM' values, and replaces the target CMYK+NM values with the CM'YK+NM' values in the five-color CMYK+MN image data. Then, the process proceeds to step S226b.

Step S226b

If the conversion and replacement to the CM'YK+NM' values have been performed for all the pixels of the pre-conversion five-color CMYK+NM image data (YES in step S226b), the process proceeds to step S227b. If the processing has not been completed for all the pixels (NO in step S226b), the process returns to step S222b.

Step S227b

The distribution calculating unit 3052c generates, as the post-conversion five-color CM'YK+NM' image data, image data in which all of the CMYK+NM values of the pixels constituting the pre-conversion five-color CMYK+NM image data have been replaced with the CM'YK+NM' values whose ratio of the device values of magenta (M) and fluorescent magenta (NM) has been changed. The CM'YK+NM' values constituting the post-conversion five-color CM'YK+NM' image data are device values dependent on the printer (plotter 231). Then, the process proceeds to step S228b.

Step S228b

The distribution calculating unit 3052c sends the generated post-conversion five-color CM'YK+NM' image data to the image output unit 306. Then, the color conversion process ends.

As described above, in the image forming apparatus 10 according to the present embodiment, the saturation X is derived from the pre-conversion five-color CMYK+NM image data by using the device values. The distribution factor γ is obtained from the saturation X, and the device values of magenta (M) and fluorescent magenta (NM) are changed by using the distribution factor γ to perform color conversion into the five-color CM'YK+NM' image data. As a result, the same effects as those of the fourth embodiment described above can be achieved. Conversion to Lab values in advance can obviate the generation process of a profile for converting from the Lab values.

In the above-described embodiment, the ratio of the device values of magenta (M) and fluorescent magenta (NM) before the change is changed. The device value of fluorescent magenta as the fluorescent color material is calculated, and the post-change CM'YK+NM' values are obtained. However, the way of obtaining the post-change CM'YK+NM' values is not limited to the above-described example. For example, the ratio of the device values of cyan (C) and fluorescent cyan (NC) or yellow and fluorescent yellow (NY) before the change may be changed, the device values may be calculated, and the CM'YK+NM' values after the change may be obtained.

Alternatively, the image data acquired by the image data acquisition unit 304c may be four-color image data. In such a case, for example, the color saturation and the distribution factor may be calculated on the assumption that the device value of NM is input as zero.

The distribution factor may be changed not only based on the saturation but also by calculating the brightness from the value of K and the saturation of CMY+NM.

In the above-described embodiments, when at least one of the functional units of the controller 200 or 200a of the image forming apparatus is implemented by executing a program, the program may be incorporated in advance and provided in a ROM or the like. In each of the above-described embodiments, the program executed by the controller 200 or 200a of the image forming apparatus may be recorded and provided in a computer-readable storage medium such as a compact disc read only memory (CD-ROM), a flexible disk (FD), a compact disk recordable (CD-R), or a digital versatile disc (DVD) as a file in an installable format or an executable format. In each of the above-described embodiments, the program executed by the controller 200 or 200a of the image forming apparatus may be stored in a computer connected to a network such as the Internet and provided by being downloaded via the network. In each of the above-described embodiments, the program executed in the controller 200 or 200a of the image forming apparatus may be provided or distributed via a network such as the Internet. In each of the above-described embodiments, the program executed by the controller 200 or 200a of the image forming apparatus has a module configuration including at least one of the above-described functional units. As actual hardware, the CPU 201 reads the program from the above-described storage device (for example, the system memory 202 or the auxiliary storage device 208) and executes the program, so that the above-described functional units are loaded onto the main storage device and generated.

In the embodiments described above, examples of the present disclosure are described, and embodiments of the present disclosure are not limited to the configurations of the above-described embodiments. In particular, the specific shapes and numerical values of the respective parts and components illustrated in the respective embodiments are merely examples of embodiments of the present disclosure, and the technical scope of the present disclosure is not limited thereto. The present disclosure can be appropriately modified without departing from the technical idea described in the claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus, comprising control circuitry configured to:
   acquire first image data to be subjected to color conversion, wherein the first image data comprises CMYK image data; and
   convert the first image data into second image data in which a dot area ratio of a target process color of process colors indicated by the first image data is distributed into a distributed dot area ratio of a fluorescent color different from the target process color and a distributed dot area ratio of the target process color, wherein a ratio between the distributed dot area ratio of the fluorescent color and the distributed dot area ratio of the target process color in the second image data is $(1-\alpha):\alpha$ ($0<$distribution factor $\alpha<1$), where the dot area ratio of the target process color indicated by the first image data is 1;
   wherein the target process color has a same color system as a color system of the fluorescent color;
   wherein the dot area ratio of the target process color is included in a first profile in which color values of a color space are associated with dot area ratios of the process colors;
   wherein the control circuitry is configured to:
      generate a second profile in which a combination of the distributed dot area ratio of the target process color and the distributed dot area ratio of the fluorescent color is associated with the color values of the color space;
      convert the dot area ratios of the process colors indicated by the first image data to converted color values of the color space using the first profile; and
      convert the converted color values to the dot area ratios of the process colors, including the distributed dot area ratio of the target process color and the distributed dot area ratio of the fluorescent color, using the second profile, to convert the first image data into the second image data.

2. The image processing apparatus according to claim 1, wherein the target process color has an absorption spectrum peak closest to an absorption spectrum peak of the fluorescent color among the process colors.

3. The image processing apparatus according to claim 1, wherein the distribution factor $\alpha$ is a fixed value.

4. The image processing apparatus according to claim 3, wherein the distribution factor α is 0.4.

5. The image processing apparatus according to claim 1, wherein the control circuitry is configured to calculate a saturation from a color value of the color space included in the first profile, and determine the distribution factor α according to the saturation.

6. An image processing apparatus, comprising control circuitry configured to:
acquire first image data to be subjected to color conversion; and
convert the first image data into second image data in which a dot area ratio of a target process color of process colors indicated by the first image data is distributed into a distributed dot area ratio of a fluorescent color different from the target process color and a distributed dot area ratio of the target process color;
wherein the control circuitry is configured to calculate the distributed dot area ratio of the target process color and the distributed dot area ratio of the fluorescent color, using a distribution that changes based on a saturation indicated by the first image data within a predetermined range between a first predetermined saturation value and a second predetermined saturation value, the distribution factor having a positive correlation with the saturation
wherein the distribution factor is fixed outside of the predetermined range.

7. The image processing apparatus according to claim 6, wherein the control circuitry is configured not to distribute the dot area ratio of the target process color to the distributed dot area ratio of the fluorescent color when the saturation is less than the first predetermined saturation value.

8. The image processing apparatus according to claim 6, wherein the control circuitry is configured to derive the saturation directly from Lab values.

9. The image processing apparatus according to claim 1, wherein the fluorescent color is fluorescent magenta.

10. An image processing method, comprising:
acquiring first image data to be subjected to color conversion, wherein the first image data comprises CMYK image data; and
converting the first image data to second image data in which a dot area ratio of a target process color of process colors indicated by the first image data is distributed into a distributed dot area ratio of a fluorescent color different from the target process color and a distributed dot area ratio of the target process color;
wherein a ratio between the distributed dot area ratio of the fluorescent color and the distributed dot area ratio of the target process color in the second image data is $(1-\alpha):\alpha$ ($0<$distribution factor $\alpha<1$), where the dot area ratio of the target process color indicated by the first image data is 1;
wherein the target process color has a same color system as a color system of the fluorescent color;
wherein the dot area ratio of the target process color is included in a first profile in which color values of a color space are associated with dot area ratios of the process colors;
wherein the converting further comprises:
generating a second profile in which a combination of the distributed dot area ratio of the target process color and the distributed dot area ratio of the fluorescent color is associated with the color values of the color space;
converting the dot area ratios of the process colors indicated by the first image data to converted color values of the color space using the first profile; and
converting the converted color values to the dot area ratios of the process colors, including the distributed dot area ratio of the target process color and the distributed dot area ratio of the fluorescent color, using the second profile.

11. A non-transitory storage medium storing computer-readable code which, when executed by one or more processors, cause the processors to execute:
acquiring first image data to be subjected to color conversion, wherein the first image data comprises CMYK image data; and
converting the first image data to second image data in which a dot area ratio of a target process color of process colors indicated by the first image data is distributed into a distributed dot area ratio of a fluorescent color different from the target process color and a distributed dot area ratio of the target process color;
wherein a ratio between the distributed dot area ratio of the fluorescent color and the distributed dot area ratio of the target process color in the second image data is $(1-\alpha):\alpha$ ($0<$distribution factor $\alpha<1$), where the dot area ratio of the target process color indicated by the first image data is 1;
wherein the target process color has a same color system as a color system of the fluorescent color;
wherein the dot area ratio of the target process color is included in a first profile in which color values of a color space are associated with dot area ratios of the process colors;
wherein the converting further comprises:
generating a second profile in which a combination of the distributed dot area ratio of the target process color and the distributed dot area ratio of the fluorescent color is associated with the color values of the color space;
converting the dot area ratios of the process colors indicated by the first image data to converted color values of the color space using the first profile; and
converting the converted color values to the dot area ratios of the process colors, including the distributed dot area ratio of the target process color and the distributed dot area ratio of the fluorescent color, using the second profile.

12. The non-transitory storage medium according to claim 11, wherein the distribution factor α is a fixed value.

13. The non-transitory storage medium according to claim 12, wherein the distribution factor α is 0.4.

14. The non-transitory storage medium according to claim 11, further comprising
calculating a saturation from a color value of the color space included in the first profile; and
determining the distribution factor α according to the saturation.

15. The non-transitory storage medium according to claim 11, wherein the fluorescent color is fluorescent magenta.

16. The method according to claim 10, wherein the distribution factor α is a fixed value.

17. The method according to claim 16, wherein the distribution factor α is 0.4.

18. The method according to claim 10, further comprising
calculating a saturation from a color value of the color space included in the first profile; and
determining the distribution factor α according to the saturation.

19. The method according to claim 10,
wherein the fluorescent color is fluorescent magenta.

* * * * *